US010402829B1

(12) United States Patent
Baar et al.

(10) Patent No.: US 10,402,829 B1
(45) **Date of Patent: *Sep. 3, 2019**

(54) SYSTEMS AND METHODS FOR USING SHARED DATABASES FOR MANAGING SUPPLEMENTAL PAYMENT SOURCES

(71) Applicant: Worldpay, LLC, Symmes Township, OH (US)

(72) Inventors: Erik Baar, Cincinnati, OH (US); Richard Hill, Cincinnati, OH (US)

(73) Assignee: Worldpay, LLC, Symmes Township, OH (US)

( * ) Notice: Subject to any disclaimer, the term of this patent is extended or adjusted under 35 U.S.C. 154(b) by 144 days.

This patent is subject to a terminal disclaimer.

(21) Appl. No.: 15/261,093

(22) Filed: Sep. 9, 2016

(51) Int. Cl.
*G06Q 40/00* (2012.01)
*G06Q 20/40* (2012.01)
(Continued)

(52) U.S. Cl.
CPC ......... *G06Q 20/405* (2013.01); *G06Q 20/227* (2013.01); *G06Q 20/387* (2013.01)

(58) Field of Classification Search
CPC ... G06Q 20/405; G06Q 20/387; G06Q 20/227
See application file for complete search history.

(56) References Cited

U.S. PATENT DOCUMENTS 7,860,789 B2 * 12/2010 Hirka .................... G06Q 20/04 705/39
8,099,361 B1 * 1/2012 Gupta .................... G06Q 20/10 705/39

(Continued)

FOREIGN PATENT DOCUMENTS

WO WO-2008153766 A2 * 12/2008 ............ G06Q 20/04
WO WO-2014071338 A2 * 5/2014 ............ G06Q 20/36

OTHER PUBLICATIONS

Erin El Issa, "Understand Merchant Category Codes to Maximize Credit Card Rewards," NerdWallet, published at www.nerdwallet.com/blog/credit-cards/merchant-category-codes-credit-card-rewards; Dec. 10, 2014 (Year: 2014).*

(Continued)

*Primary Examiner* — Abhishek Vyas
*Assistant Examiner* — William B. Bunker
(74) *Attorney, Agent, or Firm* — Bookoff McAndrews, PLLC

(57) ABSTRACT

Systems and methods are disclosed for managing a plurality of supplemental payment sources of a user. One method includes: receiving a primary payment source account of a user for a purchase transaction originating at the merchant, the primary payment source account having an identifier associated with one or more supplemental payment source accounts; receiving supplemental payment source accounts of a user for applying to a payment transaction originating at the merchant; receiving, from a user device, preference settings to apply one or more of the supplemental payment source accounts to a payment transaction; receiving a transaction authorization request from the merchant or merchant acquirer for a transaction amount; and determining a combination of payment source accounts to use in the payment transaction, from a group comprising one or more supplemental payment source accounts and the primary payment source account, and any of one or more preference settings.

18 Claims, 9 Drawing Sheets

(51) Int. Cl.

| | |
|---|---|
| ***G06Q 20/22*** | (2012.01) |
| ***G06Q 20/38*** | (2012.01) |

(56) References Cited

U.S. PATENT DOCUMENTS

| | | | | |
|---|---|---|---|---|
| 8,972,298 | B2 * | 3/2015 | Kunz | G06Q 20/105 705/44 |
| 9,235,831 | B2 * | 1/2016 | Rolf | G06Q 20/02 |
| 9,298,806 | B1 * | 3/2016 | Vessenes | G06Q 30/00 |
| 9,569,768 | B2 * | 2/2017 | Kean | G06Q 20/204 |
| 9,916,575 | B2 * | 3/2018 | Salcedo | G06Q 20/3278 |
| 2009/0192904 | A1 * | 7/2009 | Patterson | G06Q 20/20 705/17 |
| 2010/0211445 | A1 * | 8/2010 | Bodington | G06Q 30/02 705/14.17 |
| 2012/0101882 | A1 * | 4/2012 | Todd | G06Q 20/202 705/14.17 |
| 2014/0012704 | A1 * | 1/2014 | Mizhen | G06Q 30/06 705/26.41 |
| 2015/0227957 | A1 * | 8/2015 | Bradley | G06Q 30/0226 705/14.27 |
| 2017/0046799 | A1 * | 2/2017 | Chan | G06Q 20/0655 |

OTHER PUBLICATIONS

Anonymous, "Method for Debiting Specific Bank Account Based on Merchant Attributes," published Mar. 1, 2013 at IP.com No. IPCOM000225732D (Year: 2013).*

* cited by examiner

SYSTEMS AND METHODS FOR USING SHARED DATABASES FOR MANAGING SUPPLEMENTAL PAYMENT SOURCES

FIELD OF DISCLOSURE

The present disclosure relates generally to the field of payment transactions and, more particularly, to managing supplemental payment sources in payment transactions.

BACKGROUND

When consumers approach a merchant to conduct a payment transaction, they typically must select from a variety of payment sources. For example, a consumer might choose to pay using his or her credit card or debit card, or a store credit or gift card loaded with funds useable only at that merchant. Likewise, the consumer may choose to pay using points earned through a loyalty program and/or use an alternate currency, such as Bitcoin or another peer-to-peer currency. In some cases, a consumer might desire to use a variety of payment sources in combination. For example, a user might want to pay for part of a purchase using an available amount of funds remaining on a store credit or gift card, and pay for the remainder of the purchase using the user's credit card.

The task of selecting the right payment source(s), or combination of payment sources, for any given payment transaction with a merchant becomes particularly burdensome since the consumer may need to use multiple payment vehicles (i.e., cards, vouchers, or mobile apps). Moreover, the user may have to log-in and manage multiple accounts, and in some cases follow special procedures for their use. Thus, there is a desire for a system and method of enabling consumers to manage multiple supplemental payment sources for a given transaction, in some cases based primarily on one primary account, and/or based on the identity of the merchant the consumer is patronizing. The management of multiple payment sources by consumers, merchants, and financial institutions may also pose the risk of inconsistencies in accounting. Thus, there is also a desire for a uniform accounting of multiple payment sources linked to a single account.

SUMMARY

According to certain aspects of the present disclosure, systems and methods are disclosed for using shared databases and user interfaces for managing a plurality of supplemental payment sources of a user.

In one embodiment, a computer-implemented method is disclosed for managing a plurality of supplemental payment sources of a user. The method comprises: receiving an identifier of a primary payment source account of a user for applying resources to transactions originating at one or more merchants, the primary payment source account being accounted for in a first data structure of a shared ledger and having its identifier linked with one or more supplemental payment source accounts of the user; receiving identifiers of one or more supplemental payment source accounts of the user for applying resources to transactions originating at one or more merchants, the supplemental payment source accounts being accounted for in second and subsequent data structures of the shared ledger; receiving, from the user, and storing in relation to the identifier of the user's primary payment source account, preference settings for applying resources of the primary payment source account and one or more of the supplemental payment source accounts to merchant transactions, based on identities or categories of merchants involved in the transactions; receiving a transaction authorization request from a merchant or merchant acquirer involved in a transaction, wherein the transaction authorization request identifies the primary payment source account of the user, an amount of the transaction, and the merchant at which the transaction originates; evaluating the preference settings stored in relation to the received identifier of the user's primary payment source account to identify a combination of payment source accounts to use in relation to the transaction, the payment source accounts being selected from a group comprising the primary payment source account of the user and one or more supplemental payment source accounts of the user, the combination being allocated to the transaction according to the evaluated preference settings and the identities or categories of merchants involved in the transactions; processing the transaction using resources defined by the identified combination of payment source accounts, wherein processing the transaction comprises accounting for deducting resources from the primary payment source account and/or one or more payment source accounts according to the identified combination; updating the first, second, and/or subsequent data structures of the shared ledger to reflect the accounting for deducting resources from the accounts of the primary payment source account and supplemental payment source accounts according to the identified combination; and transmitting a transaction authorization response to the merchant or merchant acquirer.

In accordance with another embodiment, a system is disclosed for using shared databases and user interfaces for managing a plurality of supplemental payment sources of a user. The system comprises: a data storage device storing instructions for using shared databases and user interfaces for managing a plurality of supplemental payment sources of a user; and a processor configured for: receiving an identifier of a primary payment source account of a user for applying resources to transactions originating at one or more merchants, the primary payment source account being accounted for in a first data structure of a shared ledger and having its identifier linked with one or more supplemental payment source accounts of the user; receiving identifiers of one or more supplemental payment source accounts of the user for applying resources to transactions originating at one or more merchants, the supplemental payment source accounts being accounted for in second and subsequent data structures of the shared ledger; receiving, from the user, and storing in relation to the identifier of the user's primary payment source account, preference settings for applying resources of the primary payment source account and one or more of the supplemental payment source accounts to merchant transactions, based on identities or categories of merchants involved in the transactions; receiving a transaction authorization request from a merchant or merchant acquirer involved in a transaction, wherein the transaction authorization request identifies the primary payment source account of the user, an amount of the transaction, and the merchant at which the transaction originates; evaluating the preference settings stored in relation to the received identifier of the user's primary payment source account to identify a combination of payment source accounts to use in relation to the transaction, the payment source accounts being selected from a group comprising the primary payment source account of the user and one or more supplemental payment source accounts of the user, the combination being allocated to the transaction according to the evaluated preference settings and the identities or categories of merchants involved in the transactions; processing the transaction using resources defined by the identified combination of payment source accounts, wherein processing the transaction comprises accounting for deducting resources from the primary payment source account and/or one or more payment source accounts according to the identified combination; updating the first, second, and/or subsequent data structures of the shared ledger to reflect the accounting for deducting resources from the accounts of the primary payment source account and supplemental payment source accounts according to the identified combination; and transmitting a transaction authorization response to the merchant or merchant acquirer.

In accordance with another embodiment, a non-transitory machine-readable medium is disclosed that stores instructions that, when executed by a supplemental payment service computing system, causes the supplemental payment service computing system to perform a method for using shared databases and user interfaces for managing a plurality of supplemental payment sources of a user. The method includes: receiving an identifier of a primary payment source account of a user for applying resources to transactions originating at one or more merchants, the primary payment source account being accounted for in a first data structure of a shared ledger and having its identifier linked with one or more supplemental payment source accounts of the user; receiving identifiers of one or more supplemental payment source accounts of the user for applying resources to transactions originating at one or more merchants, the supplemental payment source accounts being accounted for in second and subsequent data structures of the shared ledger; receiving, from the user, and storing in relation to the identifier of the user's primary payment source account, preference settings for applying resources of the primary payment source account and one or more of the supplemental payment source accounts to merchant transactions, based on identities or categories of merchants involved in the transactions; receiving a transaction authorization request from a merchant or merchant acquirer involved in a transaction, wherein the transaction authorization request identifies the primary payment source account of the user, an amount of the transaction, and the merchant at which the transaction originates; evaluating the preference settings stored in relation to the received identifier of the user's primary payment source account to identify a combination of payment source accounts to use in relation to the transaction, the payment source accounts being selected from a group comprising the primary payment source account of the user and one or more supplemental payment source accounts of the user, the combination being allocated to the transaction according to the evaluated preference settings and the identities or categories of merchants involved in the transactions; processing the transaction using resources defined by the identified combination of payment source accounts, wherein processing the transaction comprises accounting for deducting resources from the primary payment source account and/or one or more payment source accounts according to the identified combination; updating the first, second, and/or subsequent data structures of the shared ledger to reflect the accounting for deducting resources from the accounts of the primary payment source account and supplemental payment source accounts according to the identified combination; and transmitting a transaction authorization response to the merchant or merchant acquirer.

Additional objects and advantages of the disclosed embodiments will be set forth in part in the description that follows, and in part will be apparent from the description, or may be learned by practice of the disclosed embodiments. The objects and advantages on the disclosed embodiments will be realized and attained by means of the elements and combinations particularly pointed out in the appended claims.

It is to be understood that both the foregoing general description and the following detailed description are exemplary and explanatory only and are not restrictive of the detailed embodiments, as claimed.

DETAILED DESCRIPTION

Various non-limiting embodiments of the present disclosure will now be described to provide an overall understanding of the principles of the structure, function, and use of systems and methods disclosed herein for the management of supplemental payment sources using shared databases and user interfaces.

As described above, consumers may find it burdensome to select and use their desired payment source(s), or combination of payment sources, to provide payment during a transaction with a merchant. For example, consumers may be forced to remember various payment sources, manage the various accounts and log-ins for those payment sources, carry multiple associated payment vehicles (e.g., credit cards, debit cards, gift cards, vouchers, e-coupons, etc.), and finally come to a decision on the right combination of payment sources to use during a payment transaction with a merchant.

Thus, the embodiments of the present disclosure are directed to improving a user's experience in conducting a payment transaction with a merchant by enabling the user to link the multiple "supplemental" payment sources to a single payment account. In some cases, the various payment sources associated with multiple different financial institutions may be associated with the user's primary payment source, thereby enabling the user to conduct a payment transaction with a merchant using a single payment vehicle (e.g., one credit card) linked to the various payment sources. Furthermore, the embodiments of the present disclosure provide user interfaces to enable the addition or deletion of new payment sources, the selection of the desired combination of and amounts to be deducted from the various payment sources, and the entry of merchant information. Furthermore, the embodiments of the present disclosure provide a centralized system for managing and accounting for the user's various payment sources using a shared ledger that, in one embodiment, utilizes block chain technology to manage accounting against the supplemental payment sources and accounts.

One or more examples of these non-limiting embodiments are illustrated in the selected examples disclosed and described in detail with reference made to FIGS. 1-3, 4A-4B, 5A-5B, and 6A-6D in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Figure 1:
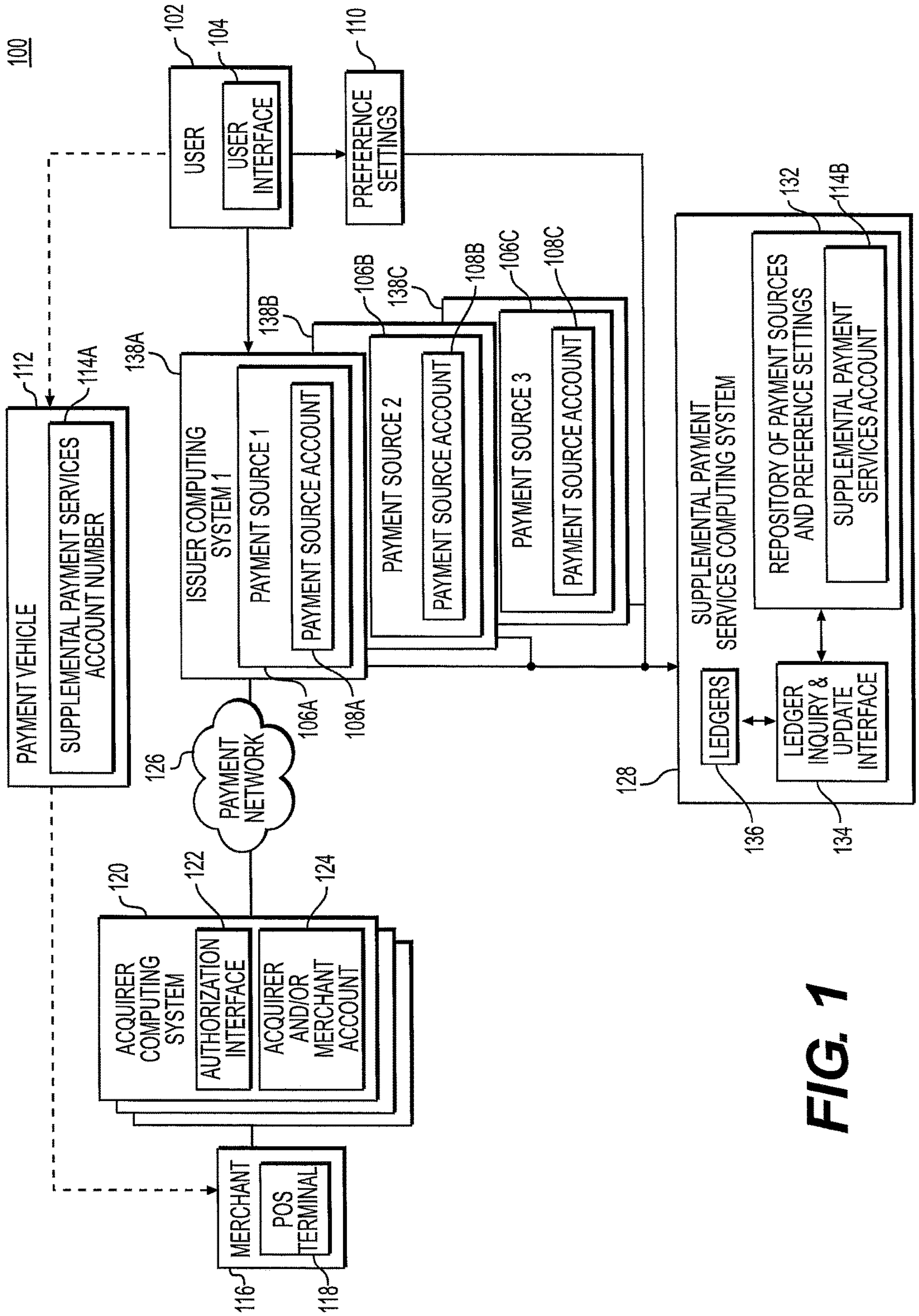
FIG. 1 depicts a block diagram of an example supplemental payment sources management environment and systems, in accordance with non-limiting embodiments.

FIG. 1 depicts a block diagram of an example supplemental payment sources environment and management system 100. At a high level, supplemental payment sources environment and management system 100 comprises: a merchant 116 operating a POS terminal 118; an acquirer computing system 120 connecting merchant 116 to payment network 126; and one or more issuer computing systems 138A-138C connecting a user 102 to payment network 126. Supplemental payment sources environment and management system 100 also comprises a supplemental payment services computing system 128 which is communicatively coupled to issuer computing systems 138A-138C and user 102.

Various embodiments of the present disclosure may involve a user 102 conducting a payment transaction with merchant 116 using a payment vehicle 112, e.g., a credit card, debit card, or the like. It will be appreciated by those of skill in the art that user 102 may present payment vehicle 112 at POS terminal 118 of merchant 116 to initiate a payment transaction. POS terminal 118 of merchant 116 may transmit transaction information to payment network 126 via acquirer computing system 120. Payment network 126 may further transmit the transaction information back to an issuer computing system 138A-138C that issued payment vehicle 112 to user 102.

As shown in FIG. 1, payment vehicle 112 may be linked with a financial account of resources or funds defined by a primary account number ("PAN"), which may be referred to for purposes of the present disclosure as a supplemental payment services account number 114A. In one embodiment, supplemental payment services account number 114A may define or identify a PAN of one of payment source accounts 108A-108C, established by a given issuer computing system 138A-138C. As described above, a user may wish to link multiple payment sources with a single payment vehicle 112. Thus, FIG. 1 depicts a plurality of various supplemental payment source accounts 108A-108C associated with a plurality of issuer computing systems 138A-138C, any of which the user may selectively link to supplemental payment services account number 114A of the single payment vehicle 112. According to the present disclosure, funds from the various payment source accounts (114A and 106A-106C) may be applied to a given transaction according to defined combinations, rules, and or preferences ("preference settings 110") predetermined by the user.

The environment comprises a user 102 provided with a user interface 104 that allows the user to manage one or more payment sources 106A-106C, their respective payment source accounts 108A-108C, and the preference settings 110 for managing these payment sources. It is contemplated that one of the payment source(s) and its respective payment source account may be a user's primary payment source account.

As shown in FIG. 1, supplemental payment services computing system 128 generally comprises a repository of payment sources and preference settings 132 ("repository"), a ledger inquiry and update interface 134, and a plurality of ledgers 136. Repository 132 may store or be otherwise associated with supplemental payment services accounts 114B. In one embodiment, ledgers 136 are shared ledgers that may be replicated across payment network 126 and may be continually updated using a block chain approach. In one embodiment, the acquirer may be an extension of or managed by the supplemental payment services computing system. For example, the supplemental payment services computing system 128 may serve the function of the acquirer 120, and receive information regarding the payment transaction directly from the POS terminal 118. In such embodiments, the supplemental payment services computing system 128 may intercept the functions of an acquirer 120 (e.g., deciding discount rates) and/or payment network 126, while also serving the function of managing a payment transaction based on supplemental payment sources.

In one embodiment, the supplemental payment services computing system 128 may provide the management system with an alternative or additional payment network. This alternative or additional payment network, being hosted by the supplemental payment services computing system 128, may allow the system to bypass or avoid fees (e.g., interchange fees) related to the transfer of data across existing payment networks. As used herein, the term POS system is used broadly to include POS systems at brick and mortar locations and "virtual" POS systems that can be associated with online retailors or "in-app" purchases. In some cases, each POS terminal 118 includes a physical terminal, or other network computing system used to facilitate a payment transaction at a merchant location 116. The term "merchant," as used herein, refers generally to any type of retailer, service provider, or any other type of business that is in networked communication with acquirer computing system 120 and uses the payment processing services of acquirer computing system 120. Payment processing services may include receiving and responding to authorization requests as well as facilitating the settlement of funds associated with card-based transactions occurring at merchant 116.

In accordance with some embodiments, each POS system 118 may be generally unmodified or "stock" and simply facilitate the standard transmission of transaction-related information to the acquirer computing system 120, as is known in the art. The transaction-related information may comprise a transaction authorization request ("authorization request"), including but not limited to, a payment amount, a date, a time, a primary account number (which may be the supplemental payment services account number associated with the user) as well as other types of identifying indicia (e.g., merchant identification). The identifying indicia may vary based on POS system 118, the type of merchant, and the type of transaction, but example types of identifying indicia may include any of the following: the supplemental payment services account number of the user; a user's name or other user identifier; a merchant identification (MID) identifier; a merchant category code (MCC) identifier; a media access control (MAC) identifier; an internet protocol (IP) identifier; a geographic identifier; and/or a payment type identifier.

A user 102, sometimes referred to as a consumer, a cardholder, or a card member, may provide identifying information, including the supplemental payment services account number 114A of the user, to the POS terminal 118 to initiate a transaction with merchant 116 using the user's payment vehicle 112 (e.g., an enrolled credit card). In some cases, the user 102 may use a computing device or mobile device (not shown) to initiate the transaction, such as for a card-not-present transaction at an online merchant. As schematically illustrated, user 102 may have multiple payment sources 106A-106C that can be selectively used by the user for the payment transaction that is initiated at the merchant 116 using the payment vehicle 112. While three payment sources 106A-106C are illustrated, user 102 may enroll any suitable number of different payment sources 106A-106C, which may or may not be issued by the same financial institution. Examples of these payment sources 106A-106C may include a consumer's checking or savings account, loyalty programs, store accounts, rewards points, and/or alternate currencies. The one or more payment sources 106A-106C may be used by the cardholder through a single payment vehicle, thereby making the task of managing multiple payment sources easier for a consumer. In one embodiment, the payment vehicle 112 may be issued by the institution or issuer of the user's primary payment source, which may allow the management system to link other payment sources for the management of supplemental payment sources. In addition, the user 102 may create and manage preference settings 110 for, among other things, setting the sequence or proportions by which the one or more payment sources should be applied to any given transaction initiated with payment vehicle 112 at one or more merchants 116. Thus, payment vehicle 112 may enable user 102 to initiate a transaction with merchant 116 using any of the cardholder's supplemental payment sources and according to the cardholder's preference settings 110 for those payment sources.

For example, in one illustrative scenario, a cardholder's supplemental payment sources 106A-106C include the cardholder's checking account and a merchant gift card containing a specified amount of funds for a particular merchant. The cardholder's preference settings call for all funds in the merchant gift card to be used before any funds from the checking account are used, for a given transaction with the merchant. If the cardholder were to initiate the transaction with the merchant using the cardholder's checking account (debit card) as the payment vehicle, then the transaction would be processed such that all funds in the cardholder's merchant gift card are used before any funds from the cardholder's checking account are used.

In some embodiments, if a user were to designate a payment source as being a "primary payment source," then the designated payment source may be used, for example, as a default payment source for a transaction. The primary payment source could also be applied by default if all other payment sources have insufficient funds, if a set of payment sources and/or preference settings have not been designated yet by the user for a transaction, or if a transaction using any other set of payment source(s) and/or preference settings is not otherwise possible.

Unless otherwise specified herein, a payment vehicle may include a physical card including a plastic or metallic card having a magnetic stripe, bar code, or other device or indicia indicative of an account number or other account information, and/or a virtual card, such as a display or screen shot for a mobile phone or for another portable device (e.g., a flash drive, smart chip, a laptop or portable computer), or for a computer device (e.g., a desktop computer) in combination with data indicative of an account number or other account indicative information. It is also contemplated that the payment vehicle 112 may have multiple embodiments or forms. For example, payment vehicle 112 can be a physical card (e.g., in the form of magnetic striped plastic card), a virtual card (e.g., in the form of a display on a smart phone), or both. The virtual card may be communicated by displaying a display or screen shot, and/or by transmitting a signal, such as by using NFC (Near Field Communication) technology or other secure transport technologies to complete the transaction with the selected merchants. Optionally, the virtual card may have a display element (e.g., a bar code or string of numbers) which identifies the account number associated with the card. Alternatively, the virtual card may have display elements relating to the merchants that accept the card. Data associated with payment vehicle 112 may include an encrypted or unencrypted supplemental payment services account number 114A or other encrypted or unencrypted account information and/or encrypted or unencrypted information associated with a particular user, issuer, acquirer, or merchant. In one embodiment, the supplemental payment services account number 114A may identify the cardholder's supplemental payment services account 1146.

Thus, whether payment vehicle 112 is physical or virtual, payment vehicle 112 may communicate the cardholder's supplemental payment services account number. Merchant 116 via POS terminal 118 may transfer the supplemental payment services account number and/or other account information of user 102, information related to the merchant, and a transaction authorization request to the acquirer via payment network 126.

In some embodiments, payment vehicle 112 may be in the form of a payment vehicle obtained from the issuer of a payment source that has been designated by the user to be the primary payment source. In such embodiments, the issuing authority of the primary payment source may allow the payment vehicle of the primary payment source to also be used as a payment vehicle for conducting a transaction using the supplemental payment services management system of the instant disclosure, thereby allowing the linking of other payment sources and preference settings, in addition to the primary payment source.

Referring now to acquirer computing system 120, an authorization interface 122 may receive a transaction authorization request from POS terminal 118. The authorization request may comprise various data, including, for example, a MID, a MCC, the cardholder's supplemental payment services account number 114A, and a transaction amount, among other things. In some embodiments, acquirer computing system 120 may also receive other consumer-identification related data, e.g., an email address, an IP address, etc. In yet another embodiment, the transaction authorization request detail may contain identifying information about the merchant, the merchant group, or category to which the merchant belongs to (e.g., dining, groceries, travel, etc.). Once the authorization request is received, acquirer computing system 120 may transmit the transaction authorization request, including the amount of funds required for the transaction ("transaction amount") and supplemental payments services account identification (e.g., account number 114A) received from POS terminal 118, through a payment network 126 to the supplemental payment services computing system 128, using existing payment network messaging.

In some embodiments, a component of acquirer computing system 120 (e.g., authorization interface 122) may also transmit data identifying the acquirer (e.g., the identifying information of the acquirer bank).

Still referring to FIG. 1, once the transaction authorization request is delivered to payment network 126, the transaction authorization request may be further routed and transmitted to a component of supplemental payment services computing system 128 (e.g., a communications circuitry or a peripheral device server). In one embodiment, supplemental payment services computing system 128 may read the transaction authorization request details and send a request to look up the supplemental payment services account number 114A referenced in the transaction authorization request from among the supplemental payment services account numbers 114B stored in repository 132. The request may be in the form of standard payments authorization messaging and may be made to ledger inquiry and update interface 134 to retrieve information associated with the supplemental payment services account 1146 from a repository of payment sources and preference settings 132 or ledger 136.

In one embodiment, the supplemental payment services computing system 128 may respond to the transaction authorization request with an approval, a denial, or other suitable type of response, based on whether the supplemental payment services account and/or account number 114B exists.

In the case of an authorization approval, supplemental payment services computing system 128 may ping the repository of payment sources and preference settings 132 to obtain a list of payment sources and preference settings defining the protocol for processing the transaction, according to the user's selections. The payment source(s) and preference settings associated with a supplemental payment services account 114B and/or account number 114A may depend, for example, on the type of merchant or merchant group associated with the instant transaction, whether the merchant is a recognized or unrecognized merchant, whether the transaction occurs within an active period of a payment source account, whether the user has specifically configured a set of supplemental payment sources and preference settings for the given transaction, whether the user has enabled overdraft if a payment source has insufficient funds, and/or whether the user has a primary payment source, or a set of payment source(s) and preference setting for a default transaction. For example, after looking up the supplemental payment services account number 114A and/or account 114B associated with the transaction authorization request, the repository 132 may approve the transaction and specify, based on saved data, that a combination of the consumer's checking account and a loyalty program, for example, are to be used as payment sources in the transaction, and that the consumer's preference settings dictate that funds from the loyalty program are to be drawn, in entirety, before any funds from the consumer's checking account are drawn. In one embodiment, if the consumer has not indicated a list of payment sources or preference settings to be used for the merchant with whom the consumer is transacting, a primary payment source of the consumer and/or a default payment source preference setting may be used to conduct the transaction.

Subsequently, the supplemental payments services computing system 128 may then access ledger 136 and/or subledger(s) and/or cause the ledger inquiry & update interface 134 to access ledger 136 and/or subledger(s) to check whether available funds exist in the listed payment sources to allow the transaction, as per the preference settings. Ledger inquiry and update interface 132 may respond to requests to add or delete and/or update payment sources, update a user's payment source data, and/or payment source preference settings. If insufficient funds exist in one or more of the payment sources to be used for the instant transaction, based on the amounts specified by preference settings to complete the transaction, the transaction authorization request may be denied. In some embodiments, when insufficient funds exist in one or more payment source(s) based on the amounts specified by a preference setting, the management system may prompt the user to select a different set of payment source(s) and preference settings. Alternately or additionally, the management system may prompt the user to select a set of payment sources and/or preference settings designated as a default set of payment source(s) and preference settings to be used for the instant transaction. In all such embodiments, the processor may subsequently make a similar inquiry into whether sufficient funds exist in the different (or default) set of payment source(s), based on the preference settings.

In yet another embodiment, when insufficient funds exist in one or more payment source(s) based on the amounts specified by a preference setting, the management system may prompt the user to apply the primary payment source account by default to pay for the transaction, and the transaction authorization may be approved if the cardholder's primary payment source is able to solely perform the transaction.

Prior to or subsequent to determining whether sufficient funds exist in the selected payment source(s), the processor may sort or otherwise arrange the selected payment sources according to the selected preference settings for the transaction, and assign the amounts to be deducted from each payment source, according to the preference settings. The sorting and/or arrangement may occur at the repository of payment sources and preference settings 132, and/or ledger 136, and may include a sequential sorting of the supplemental payment sources in the order that they are to be used for the instant transaction.

Upon approval of the transaction authorization by the various components of the supplemental payment services computing system 128 (e.g., repository 132, ledger 136, subledger(s), etc.), the supplemental payment services system 128 may proceed to either process the transaction(s) using the selected set of payment source(s) and preference settings or initiate execution of the transaction or portions thereof by issuer computing system(s) 138A-138C. In some embodiments, the processing of the transaction occurs at supplemental payment services computing system 128, and may include a computation of new amount values stored in the respective payment source accounts used in the transaction, based on the amounts decided to be deducted from each payment source, as per the preference settings 110 and resulting transaction amounts.

Subsequently, the supplemental payment services computing system 128 may transmit a transaction authorization response to acquirer computing system 120. The acquirer computing system 120 may, in turn, provide the transaction authorization response to POS terminal 118 of merchant 116. The routing and transmission of the transaction authorization response(s) may occur through payment network 126 and/or a parallel debit or payment network hosted by supplemental payment services computing system 128.

After completing a successful transaction at merchant 116, a settlement event may occur that generally transfers funds from the accounts of the various payment sources 106A-106C to an account of a merchant and/or acquirer. The various payment sources 106A-106C may belong to one or more issuers but may be linked to the supplemental payment services account 114B identified by payment vehicle 112.

The ledger 136 and/or subledgers of the computing system may be continually updated, and may be updated to reflect an accurate balance of a consumer's payment sources, debt, and credit. Following the given transaction, the ledger may be properly updated via a ledger inquiry and update server to reflect the correct balance post transaction. In some embodiments, the ledger may be updated using block chain methods.

Figure 2:
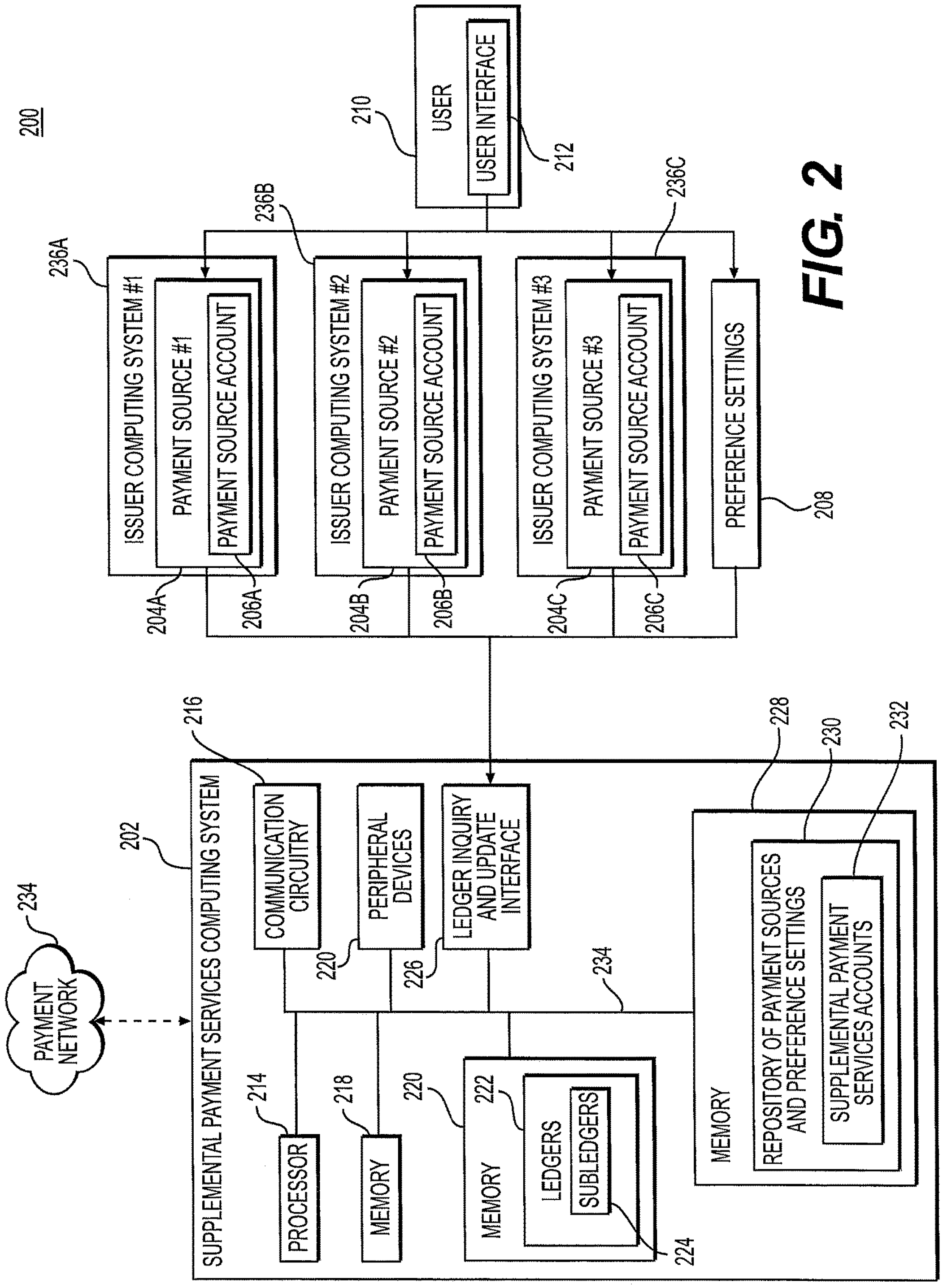
FIG. 2 depicts a block diagram of an example supplemental payment services computing system, in accordance with non-limiting embodiments.

Referring now to FIG. 2, the supplemental payment services computing system 128 (here 202) may be embodied as any type of server or computing device capable of processing, communicating, storing, maintaining, and transferring data. In the illustrative embodiment of FIG. 2, the supplemental payment services computing system 202 includes a system bus 234 connecting a processor 214, communication circuitry 216, memory 218, peripheral devices 220, data storage including ledgers 222 and/or subledgers 224, ledger inquiry and update interface 226, and a data storage 228 including a repository 230 of payment sources and preference settings associated with supplemental payment services accounts 232.

Of course, the supplemental payment services computing system 202 may include other or additional components, such as those commonly found in a server and/or computer (e.g., various input/output devices), in other embodiments. Additionally, in some embodiments, one or more of the illustrative components can be incorporated in, or otherwise from a portion of, another component. For example, the memory 218, or portions thereof, may be incorporated in the processor 214. In another example, the ledger(s) 222, subledger(s) 224, and repository 230 of payment sources and preference settings associated with a supplemental payment services account 232 may be incorporated within one data storage component of the supplemental payment services computing system 202, which may be referred to as an electronic storage medium.

In some embodiments, one or more of the memory devices 220 and 228 may include one or more shared ledger(s) 222 and subledger(s) 224. The ledger(s) 222 and subledger(s) 224 may, individually or collectively, store and account for transaction data (e.g., supplemental payment services account numbers, transaction amount data, etc.), cardholder-specific data (e.g., cardholder identifiers such as electronic mail addresses, IP addresses mailing addresses, marketing preferences, etc.), and data related to the payment sources and payment source preference settings involved in each transaction. Information for the ledger may be captured and received from the merchant POS terminal 118, acquirer computing system 120, repository of payment sources and preference settings 132, the ledger inquiry and update interface 134, or any other device or system. It should be appreciated that some or all of the cardholder data may be encrypted, tokenized, or otherwise secured. In some embodiments, anonymized consumer segmentations are used to reduce the need to store personally identifiable information.

Examples of entries within the shared ledger(s) 222 and/or subledger(s) 224 that relates to payment source may include the identifying information, account balances, credits and debits for loyalty programs, store accounts, alternate currencies, checking or savings accounts, loans, merchant gift cards, or any other source of funds that would otherwise require separate accounting.

In one embodiment, the ledger is shared and/or replicated among third party integrators. Having a copy of the shared ledger in close network proximity to the components and nodes involved with the transaction authorization process allows the processing of the transaction authorization to be more efficient and minimizes the risks of inconsistencies.

The ledger(s) 222 and/or subledger(s) 224, shared or otherwise, may be continually updated, for example, when a user or the computing system adds, deletes, or updates payment source data and/or preference settings, via the ledger inquiry or update server, and, for example, after a transaction has been finalized in order to reflect the payment sources and post-transaction account details. In one embodiment, the ledger(s) and/or subledger(s) may be updated using a block chain approach.

In some embodiments, memory device 228 may include a repository of payment sources and preference settings 230, which may include supplemental payment service data associated with supplemental payment services accounts 232. The supplemental payment service data may include one or more payment sources, 204A-204C, and their respective payment source accounts 206A-206C, and preference settings 208 linked to a supplemental payment sources account (e.g., credit cards, debit cards, gift cards, loyalty programs, etc.). The supplemental payment sources account associated with the payment sources and preference settings may also be linked to cardholder-specific data (e.g., the supplemental payment sources account number, cardholder identifiers such as electronic mail addresses, IP addresses mailing addresses, marketing preferences, etc.), which can be captured and received from the merchant POS system or any other device or system. It should be appreciated that some or all of the cardholder data can be encrypted, tokenized, or otherwise secured. The repository of payment methods associated with each account may serve the function of confirming the existence of a supplemental payment services account associated with a transaction authorization request, and returning the payment source(s) 204A-206C and preference settings 208 associated with the supplemental payment services account.

In some embodiments, a user 210 may configure the supplemental payment services computing system 202 so that a particular set of payment sources 204A-206C and/or particular preference settings 208 may be used for a particular merchant or merchant group of the transaction. In such embodiments, for example, repository 230 may inform processor 214 of the particular payment sources and/or particular preference settings associated with supplemental payment services account number 232, which are to be used for the particular merchant or merchant group.

In some embodiments, the supplemental payment sources computing system 202 may include a ledger inquiry and update interface 226. A user may add, delete, and/or update payment sources, update payment source preference settings, add merchants or merchant groups, and/or otherwise communicate with the supplemental payment source server via the ledger inquiry and update interface 226.

Figure 3:
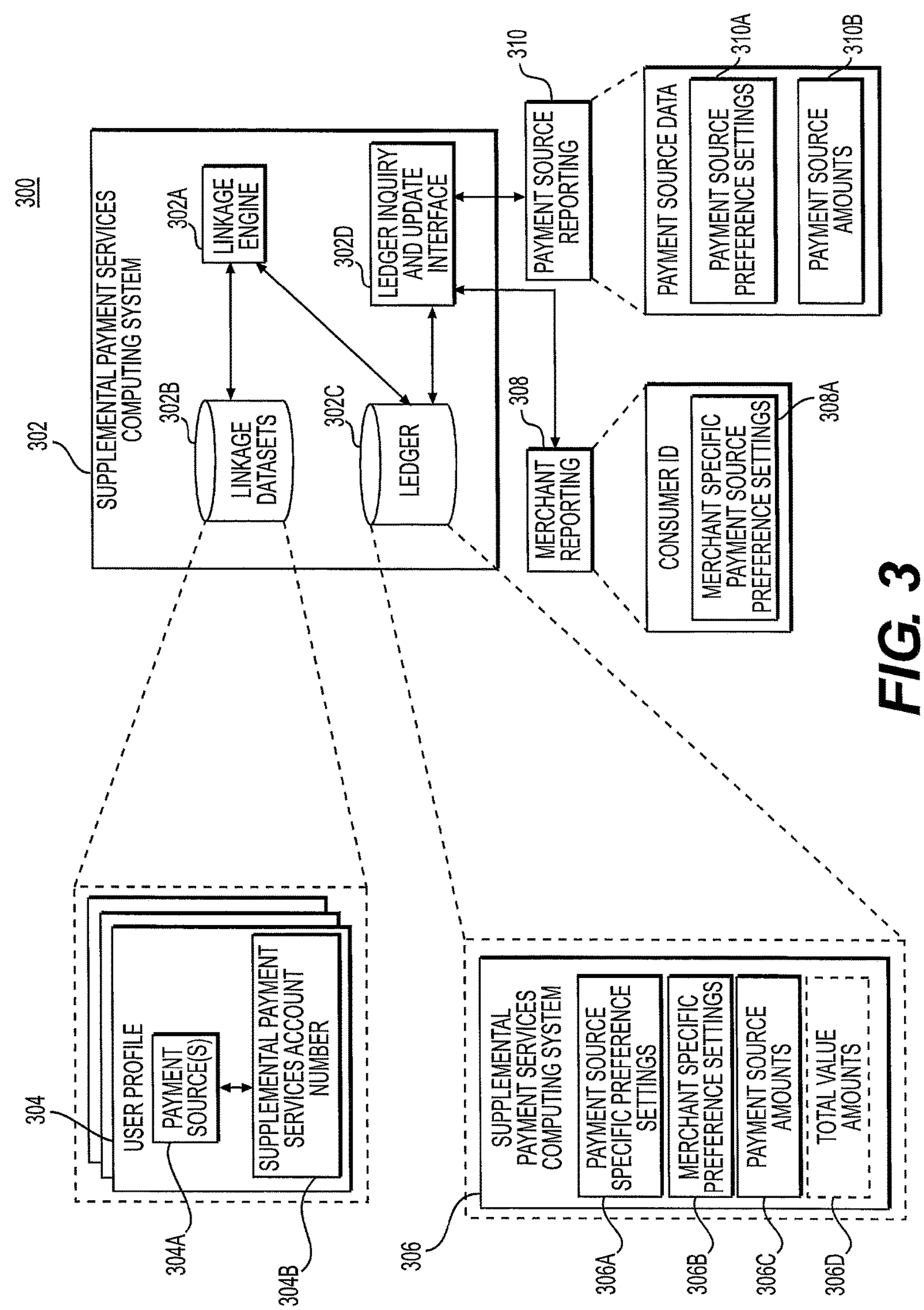
FIG. 3 depicts an example supplemental payment services computing system having a ledger, in accordance with non-limiting embodiments.

FIG. 3 depicts an example supplemental payment services computing environment 300 comprising a supplemental payment services computing system 302, which is communicatively coupled to a merchant reporting system 308 and a payment source reporting system 310. Supplemental payment services computing system 302 may comprise linkage engine 302A, linkage datasets 302B, ledger 302C, and ledger inquiry and update interface 302D. In some embodiments, linking engine 302A facilitates the association of payment sources 304A and supplemental payment services account number 304B for each user profile 304 to an associated ledger entry 302C. Linkage datasets 302B include a plurality of different user profiles 304 comprising, for example, payment source(s) 304A that are linked to a supplemental payment services account number 304B. In some embodiments, linkage datasets 302B may link user segments to a supplemental payment services account number. Accordingly, users falling into certain segments may use a common set of payment source(s) and preference settings that differ from the payment source(s) and preference settings offered to other users. In some embodiments, the supplemental payment services account number may be a form of or may serve the purpose of ledger identification for a user or a user group. Linkage engine 302A may also query the linkage datasets 302B upon receiving a transaction authorization request from a merchant or merchant acquirer to determine if a supplemental payment services account number is associated with the particular user identified in the authorization request.

Ledgers 302C comprise a plurality of variables and other information that is stored for each supplemental payment services account number 304B, including, for example, payment source specific preference settings 306A and merchant specific preference settings 306B. If the ledger 302C also serves as a repository for stored value, the supplemental payment services account number 306 may also include payment source amounts 306C and total value amount 306D. Merchant specific preference settings 306B, for example, may be set to trigger a certain preference setting for the way a set of payment source(s) are to be used for a certain merchant and/or group of merchants (also "merchant group"). Payment source specific preference settings 306A, for example, may be set to trigger certain preference settings whenever a particular payment source is used in a given transaction. The embodiments of the current disclosure may also allow for preference settings based on other factors of a given transaction, for example, a purchase amount, a purchase location, a type of purchase, a number of purchases, the time or sequence of purchase, or any other suitable factor that may influence the choice of a preference setting for using payment source(s) in a given transaction. The payment source amounts 306C may be the stored value amounts of the respective payment source(s) associated with the supplemental payment services account number. A total value amount 306D may be an amount of funds that is the combined total of the value amounts from each payment source associated with the supplemental payment services account number 306 and accessible to the user via a payment vehicle.

As illustrated, a ledger inquiry and update interface 302D may be used to provide information to the supplemental payment services computing system (e.g., adding new payment source(s), reconfiguring preference settings, etc.) and to retrieve information from the supplemental payment services computing system (e.g., receiving information on payment source amounts or total value amounts). In some embodiments, a user may access the supplemental payment services computing system 302 via a user interface (e.g., 104 and 212 in FIGS. 1 and 2, respectively). For example, a user may add, delete, and/or update information on a payment source (e.g., "payment source reporting" 310). Information reported on a payment source may include an identification (e.g., name) of the payment source, the payment source amounts 310B, and payment source specific preference settings 310A. In some embodiments, the reporting of payment source information to add the payment source to the supplemental payment services account may automatically link the payment source account, from which information on the payment source amount may be obtained.

The ledger inquiry and update interface 302D may also be used, for example, during a transaction involving a merchant and/or merchant group, with which a user has not transacted before, and may prompt the user to enter information regarding the merchant and/or merchant group (e.g., "merchant reporting" 308), including, for example, merchant specific payment source preference settings, before, during, or after a transaction. The ledger inquiry and update interface 302D may be facilitated through any suitable means, such as a web portal, an API, a specialized application, and so forth.

Figure 4A:
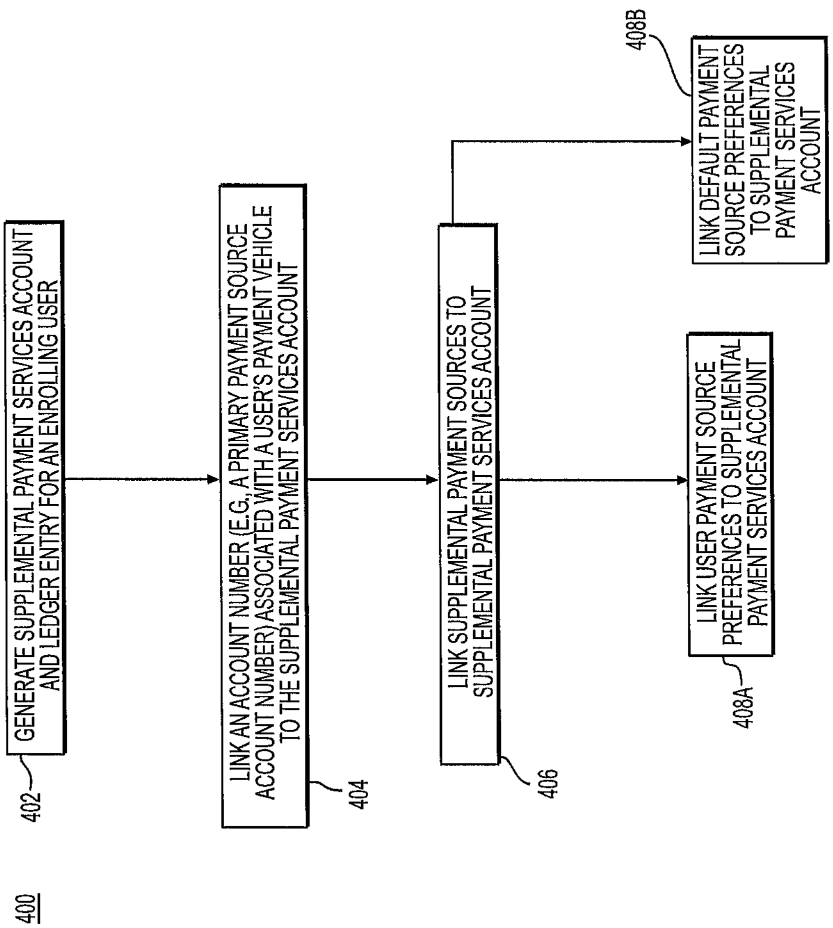
FIGS. 4A and 4B depict a flow chart of an example process executed by a supplemental payment services computing system, in accordance with non-limiting embodiments.
Figure 4B:
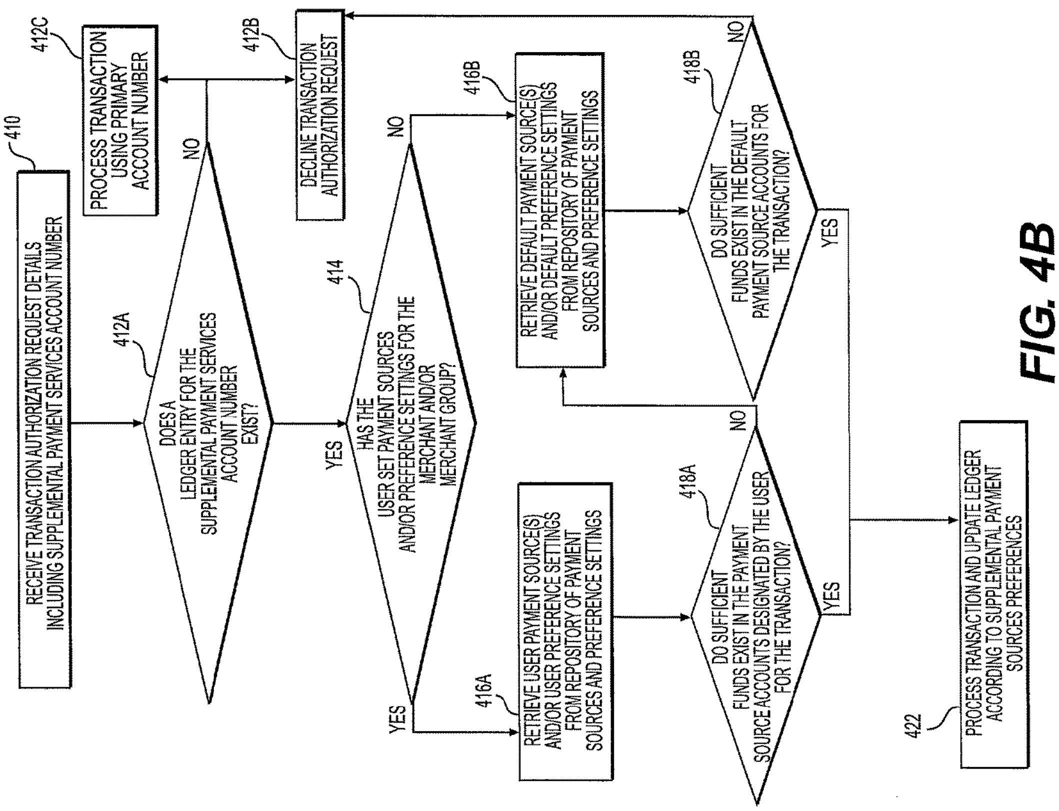

FIGS. 4A-4B depict an exemplary method 400 that may be executed by a supplemental payment services computing system for initializing a supplemental payment services account and/or updating the ledger of a user.

In one embodiment, step 402 may include generating a supplemental payment services account and ledger entry for a user. In some embodiments, the supplemental payment services account may be based on a preexisting primary payment source account and/or account number of the user. As described above, in one embodiment, the ledger may be shared and replicated across a payment network, and ledger entries may be added and/or updated using a block chain approach. The supplemental payment services account number may be a form of ledger identification for a user of the supplemental payment services management system.

Step 404 may include linking an account number associated with a user's payment vehicle to the supplemental payment services account. In some embodiments, the payment vehicle may be issued to the user by the primary payment source of the user. Additionally or alternatively, the account number associated with a user's payment vehicles may be the primary payment source account number of the user. The payment vehicle may be physical (e.g., a card) or virtual, and may be able to transfer information regarding a user (e.g., supplemental payment services account number) at a POS terminal of a merchant.

Step 406 may include linking one or more supplemental payment sources to the supplemental payment services account of the user. For example, a user may link one or more payment sources by inputting payment source identification (e.g., account and routing number of a bank), via the ledger inquiry and update interface.

Step 408A may include linking payment source preferences to a ledger entry. For example, a user may select payment sources to be used in a particular sequence or in particular proportions during a transaction with a particular merchant and/or merchant group.

Step 408B may include linking default payment source preferences to the supplemental payment services account of the user. Additionally or alternatively, the user may select a payment source from a variety of payment sources as a primary payment source or default payment source to be used during a transaction where there are no payment sources and/or preference settings configured by the user yet.

In some embodiments, steps 410-424 may correspond to a method of authorizing and executing a transaction initiated by a user. Step 410 may include receiving a transaction authorization request, which identifies a supplemental payment services account number. The transaction authorization request may include transaction details, merchant information, and/or information on the acquiring institution or computing system. The transaction authorization request may be received from the acquirer computing system and/or merchant POS via a payment network. In some embodiments, the transaction authorization request may be received at the communication circuitry before a processor may process the information within the request, including the supplemental payment services account number, transaction details, merchant information, and acquirer information. In some embodiments, different user identification techniques may also be used, in addition to or as an alternative to the supplemental payment services account number, such as identifying based on IP address, MAC address, email address, etc. In some embodiments, a form of identification of a user may be converted to another form of identification of the user, for example, to protect the security and privacy of the user.

In step 412A, the supplemental payment services computing system may determine whether the supplemental payment services account number identified in the payment transaction authorization request exists in the supplemental payment services computing system (e.g., whether the supplemental payment services account number is linked to any of the ledger entries). If the supplemental payment services account number is not linked to a ledger entry, the process may subsequently lead to step 412B, which includes denying the transaction authorization request. Additionally or alternatively, the process may subsequently lead to step 412C, if the account number of the payment vehicle of the user is based on a primary payment source of a user; step 412C may include processing the transaction using the primary payment source account number of the user. A denial of the transaction authorization request (e.g., as in step 412B) may be sent to the merchant POS and/or acquirer computing system via the payment network. In another embodiment, if a primary payment source account number is being used for the supplemental payment source account number, and the supplemental payment services computing system determines that the supplemental payment services account number is not linked to a ledger entry, the transaction authorization request may be transferred to the issuer of the primary payment source and the transaction process may thereafter be discontinued at the supplemental payment services computing system.

If the supplemental payment services computing system determines that the supplemental payment services account number is linked to a ledger entry, then, step 414 may include determining, subsequently, if the user has designated a set of payment source(s) and/or preference settings for the merchant involved in the transaction. As used herein, "merchant" may refer to a merchant involved in the transaction or to a merchant group to which the merchant belongs in (e.g., dining, groceries, travel, etc.). Merchant information may be obtained from the MID received as part of the payment transaction authorization request, or from any other suitable merchant identifier.

If the user has designated a set of payment source(s) and preference settings for the merchant, step 416A may include retrieving the set of payment source(s) and/or preference settings, designated by the user, to be used for the merchant in the transaction, from the repository of payment sources and preference settings associated with the supplemental payment services account number. Step 418A may include determining whether there are sufficient funds in the payment source accounts of the set of payment source(s) designated by the user to be used in the current transaction, to match the requisite funds for the transaction according to the preference settings designated by the user to be used in the current transaction.

If the user has not designated a set of payment source(s) and preference settings for the merchant, the method may, subsequently, perform step 416B of retrieving a set of default payment source(s) and/or default preference settings to be used for the merchant in the transaction, from the repository of payment sources and preference settings associated with the supplemental payment services account number. Step 418B may include determining whether there are sufficient funds in the payment source accounts of the set of default payment source(s) to match the requisite funds for the transaction according to the default preference settings.

Step 418A-B may include investigating the payment source accounts in the ledger of the supplemental payment services computing system If, subsequent to step 418A, there are insufficient funds in one or more of the payment source accounts of the set of payment source(s) designated by the user to be used in the current transaction, according to the preference settings designated by the user to be used in the current transaction, the process may loop to step 416B of retrieving a set of default payment source(s) and/or default preference settings to be used for the merchant in the transaction. In some embodiments, the user may designate a primary payment source to be used in transactions, for example, where there are insufficient funds in the payment source accounts of the set of payment source(s) designated by the user to be used in the instant transaction, according to the preference settings designated by the user to be used in the instant transaction. Alternatively or additionally, a user may enable the option of transacting anyway even if there are insufficient funds in one or more payment source(s) (e.g., resulting in an overdrawn or overdraft account).

Alternatively or additionally, if the supplemental payment services account number is the primary payment source account number of a user, and the user and/or supplemental payment services system has not established a set of default payment source(s) and/or default preference settings to be used for the merchant in the transaction, the method may result in transferring the transaction authorization request to the issuer (or issuer computing system) of the primary payment source account, and discontinuing the payment transaction process at the supplemental payment services computing system.

If, subsequent to step 4188, there are insufficient funds in the payment source accounts of the set of default payment source(s) to match the requisite funds for the transaction according to the default preference settings, the process may loop to step 412B of declining the transaction authorization request. In some embodiments, the user may designate a primary payment source to be used in transactions, for example, where there are insufficient funds in the payment source accounts of the set of default payment source(s) to match the requisite funds for the transaction according to the default preference settings. Alternatively or additionally, a user may enable the option of transacting anyway even if there are insufficient funds in one or more payment source(s) (e.g., resulting in an overdrawn or overdraft account).

If, subsequent to step 418A, there are sufficient funds in the payment source accounts of the set of payment source(s) designated by the user to be used in the current transaction, to match the requisite funds for the transaction according to the preference settings designated by the user to be used in the current transaction, step 420 may include processing the transaction and updating the ledger according to the preference settings of the user.

If, subsequent to step 4188, there are sufficient funds in the payment source accounts of the set of default payment source(s) to match the requisite funds for the transaction according to the default preference settings, the process may also lead to step 420 of processing the transaction and updating the ledger according to the preference settings of the user.

In some embodiments, step 420 may include lining up the payment source(s) used and the requisite funds drawn from each payment source in sequential order in the ledger and/or subledger, and then computing the post-transactional payment source amounts. The ledger may update the payment source accounts with the computed post-transaction payment source amounts. In a preferred embodiment, the ledger and/or subledger is shared and replicated through the payment network, reflecting the post-transaction payment source accounts in each replica of shared ledger. Furthermore, the ledger and/or subledger may use a block chain methodology for adding entries and/or updating itself.

Figure 5A:
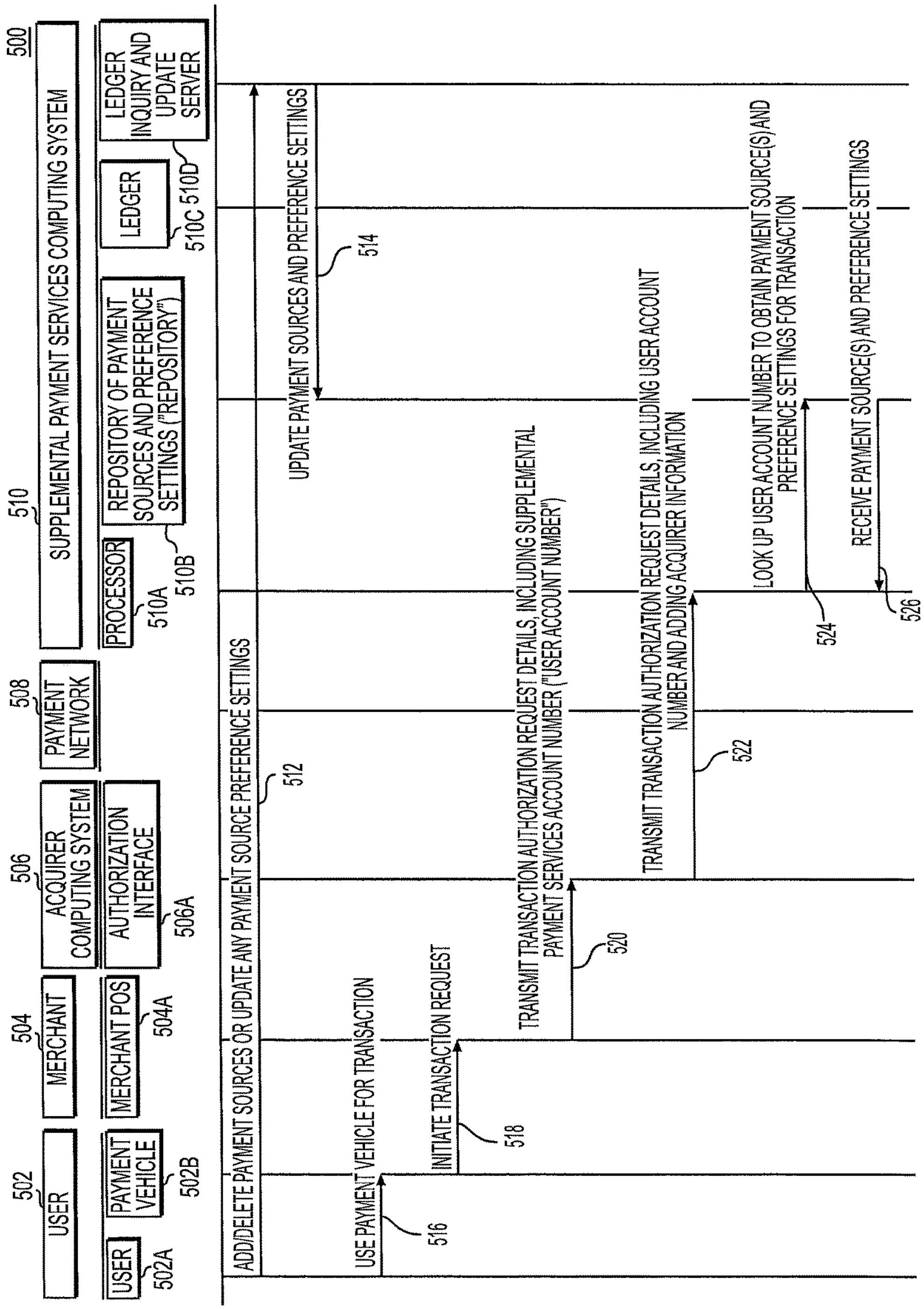
FIGS. 5A and 5B depict a flow diagram of a method for managing supplemental payment sources using shared databases and user interfaces, in accordance with non-limiting embodiments.
Figure 5B:
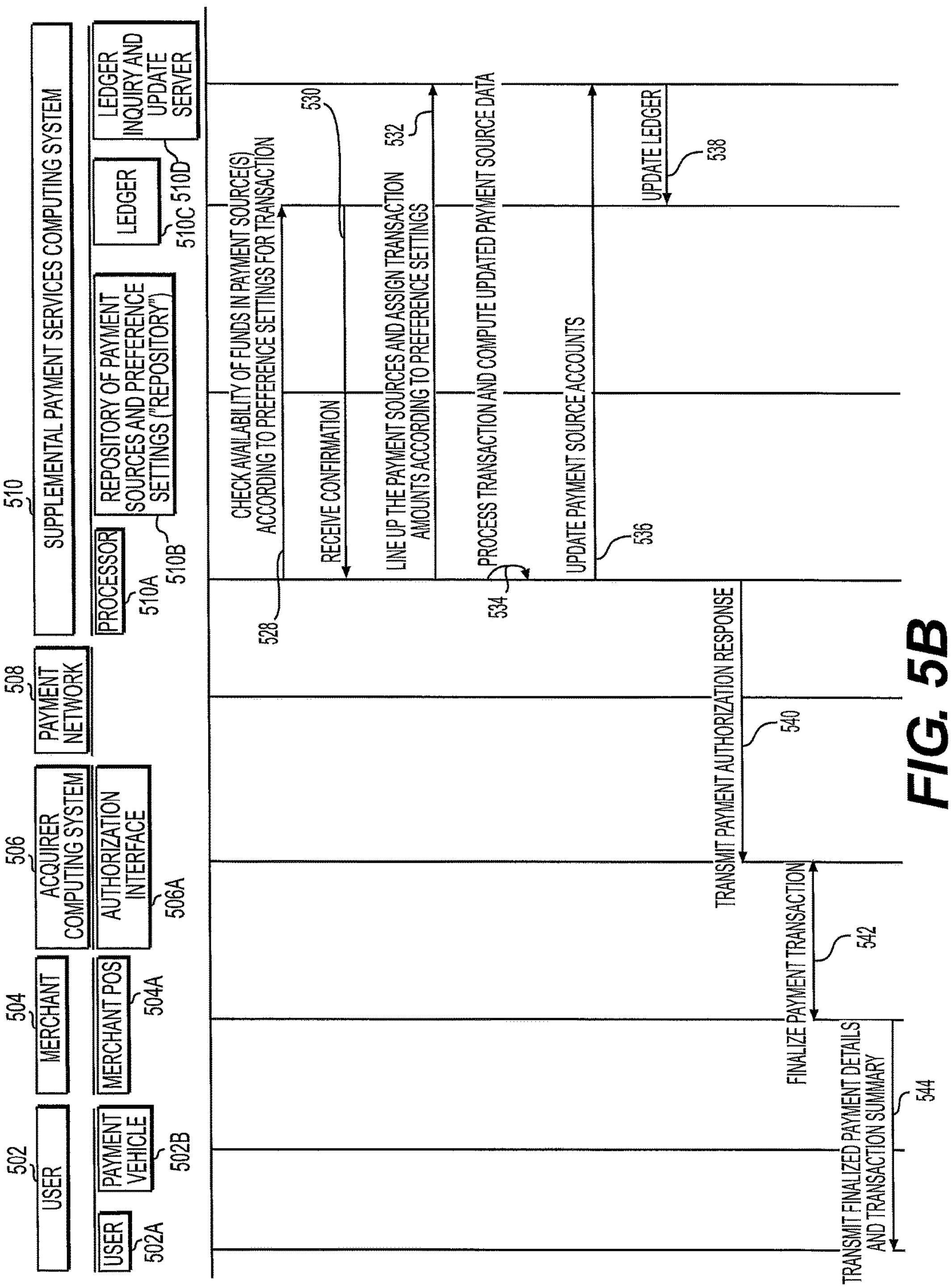

FIGS. 5A-B depict a simplified sequence flow diagram of a method 500 in accordance with one non-limiting embodiment. Method 500 may be executed by the devices and/or components related to the user 502 (e.g., user 502A and payment vehicle 502B), the merchant 504 (e.g., merchant POS 504A), the acquirer computing system 506 (e.g., authorization interface 506A), payment network 508, and the supplemental payment services computing system 510 (e.g., processor 510A, repository of payment sources and preference settings ("repository") 510B, a ledger 510C, and a ledger inquiry and update server 510D).

In some embodiments, process flows 512 and 514 may correspond to a method of configuring a supplemental payment services account and/or ledger entry for a user. For example, in process flow 512, the user 502A may add or delete payment source(s) and/or configure any payment source preference settings via the ledger inquiry and update server 510D of the supplemental payment services system 510. At process flow 514, the ledger inquiry and update server 510D may update the repository of payment sources and reference settings 5106 with the added or deleted payment sources and configured preference settings. Additionally or alternatively, the ledger inquiry and update server 510D may update the ledger 510C with the added or deleted payment sources and configured preference settings. In a preferred embodiment, the ledger 510C may be shared and replicated throughout the payment network, and may utilize block chain methods for updating itself and/or adding entries. The term "ledger" as used herein may refer to one or more ledgers, subledgers, and/or databases for accounting, which may be shared and/or replicated, at least within a payment network, and which may utilize block chain technology.

Process flows 516 through 544 may correspond to the method of processing a transaction using a supplemental payment services account and/or ledger of a user. At process flow 516, a user 502A, may use a payment vehicle 502B for a transaction. As demonstrated by process flow 518, the payment vehicle 502B may be used to initiate a transaction request at a merchant POS 504A. The payment vehicle may be physical (e.g., a card) or virtual, and may contain identifying information of the user (e.g., the supplemental payment services account number). In some embodiments, the payment vehicle may be the form of a payment vehicle obtained from the issuer of a payment source that has been designed by the user to be the primary payment source. In such embodiments, the issuing authority of the primary payment source may allow the payment vehicle of the primary payment source to also be used as a payment vehicle for conducting a transaction using the supplemental payment services management system of the instant disclosure, thereby allowing the linking of other payment sources and preference settings, in addition to the primary payment source. The purchase transaction may be associated with the sale of a good or a service by a merchant, retailer, or other entity. In some embodiments, the purchase transaction may be initiated via a business-related functionality and/or a business software executing on, or electronically accessed by, the merchant POS 504A.

In process flow 520, the merchant POS 504A may transmit a transaction authorization request to the authorization interface 506A of acquirer computing system 506. The transaction authorization request may contain identifying details about the user, such as, for example, the supplemental payment services account number of the user, and the transaction details, such as, for example, the transaction amount. In some embodiments, the transaction authorization request sent to the acquirer computing system may also contain identifying information about the merchant, such as, for example, an MID, MCC, and/or the merchant group or category in which the merchant belongs to (e.g., dining, groceries, travel, etc.). In some embodiments, for example, in the purchase of products, the transaction details may include product scan data (e.g., product identifiers) and corresponding price data. In some embodiments, the transaction details can include itemized payment amounts for each component of the product or service being transacted for, in addition to or as an alternative to the total price for the payment transaction.

In process flow 522, the acquirer computing system 506 may further transmit the transaction authorization request to a component of the supplemental payment services computing system 510 through a payment network 508. In some embodiments, further details may be added to the transaction authorization request received by the acquirer computing system 506 from the merchant POS, before being transmitted to the supplemental payment services computing system. For example, along with identifying information of the user (e.g., supplemental payment services account number), transaction details (e.g., transaction amount), and identifying information of the merchant, the acquirer computing system may add information about the acquirer and/or acquiring institution. In some embodiments, the one or more tasks associated with receiving the transaction authorization request at the acquirer computing system 506, adding acquirer identification information to the transaction authorization request, and/or delivering the augmented transaction authorization request from the acquirer computing system may occur at the authorization interface 506A of the acquirer computing system 506. In some embodiments, the supplemental payment services computing system 510 may host a network of its own ("supplemental payment services network"), in addition to or as an alternative to conventional payment networks. The supplemental payment services network may be used to transfer transaction authorization requests and transaction authorization responses or to facilitate communication with the user 502, merchant 504, acquirer computing system 506, a payment source issuer, or any other entity otherwise involved in the supplemental payment services management system.

Upon receipt of the transaction authorization request at the supplemental payment services computing system 510, a processor 510A of the supplemental payment services computing system may process the transaction authorization request, which may include, for example, obtaining identifying information of the user (e.g., supplemental payment services account number), the merchant, and the acquirer. In process flow 524, the processor 510A may look up the supplemental payment services account number, obtained from the transaction authorization request, in the repository of payment sources and preference settings 510B associated with a supplemental payment services account number. In some embodiments, process flow may involve having the ledger inquiry and update server 510 perform the function of searching within the repository 5106 for the supplemental payment service account and/or account number ("account lookup"). In another embodiment, where the transaction authorization request contains identifying details about the user in a form other than a supplemental payment services account number, the identifying details may be used to retrieve and/or look up the supplemental payment services account of the user, or may first be converted into a supplemental payment services account number of the user (e.g., by hashing another account number). Moreover, process flow 524 may include using a combination of information identifying the user (e.g., supplemental payment services account) and the merchant, in the account lookup, in order to facilitate the retrieval of a set of payment sources and/or preference settings to be used in the transaction based on the merchant (e.g., as in process flow 526 described below). If the repository 5106 does not have a record of the supplemental payment services account and/or account number, the transaction authorization request may be declined, and a response indicating a decline of the transaction authorization request may be sent to the acquirer computing system 506, merchant POS 504, and/or user 502, via the payment network 508.

If the repository contains the supplemental payment services account, process flow 526 may include the processor 510A receiving, from the repository 510B, a set of payment source(s) and preference settings to be used for the given transaction. The set of payment source(s) and preference settings associated with a supplemental payment services account may be determined based on information provided in the transaction authorization request, including but not limited to, identifying information of the merchant and/or merchant group, the date or time of the transaction authorization request, and/or the transaction amount.

For example, suppose a particular user has designated that a merchant rewards points account of the user be used in any transaction originating from a particular merchant before a credit card account of the user is applied, and the user has a supplemental payment services account associated with this designation saved in the repository 5106. If a transaction authorization request, which includes the supplemental account number of the particular user and identifying information about the particular merchant is received by the supplemental payment services computing system 510, process flow 526 may result in the processor receiving information that may include the following: the supplemental payment services account identified in the transaction authorization request exists and/or is valid; and, based on the particular merchant identified in the transaction authorization request, the transaction should be processed by first using the merchant rewards points of the particular user to satisfy the transaction amount indicated in the transaction authorization request, before using the credit card account of the user to process the transaction for any remaining transaction account. In the abovementioned example, the payment sources of the particular user that the user has designated to be used in the transaction involving the particular merchant are the merchant rewards points account of the user and the credit card account of the user. The preference settings that the user has designated to be used in the transaction involving the particular merchant may include ranking the merchants rewards points account above the credit card account in the order of use for the transaction.

The set of payment source(s) and preference settings to be used may be configured by the user 502 before or during the transaction (e.g., as in process flows 512 and 514). The set of payment source(s) and preference settings may be configured specifically for a merchant and/or merchant group, or may be configured to be used by default, when a transaction, merchant, and/or merchant group does not already have a preconfigured set of payment sources and/or preference settings. In some embodiments, where a user has not yet configured a set of payment source(s) and/or preference settings to be used for a specific transaction, merchant, and/or merchant group, the default set of payment source(s) and/or preference settings may be using the primary payment source account of the user, solely.

Referring now to FIG. 5B, in process flow 528, the processor 510A may determine whether the set of payment sources determined in process flow 526 have sufficient funds for the transaction to be processed. Process flow 528 may involve the ledger inquiry and update server 510D making an inquiry into the ledger 510C to check the current balance(s) for the one or more payment sources designated to be used in the transaction according to the information received by the processor in process flow 526. The balances of the one or more payment source account(s) may be compared with the requisite amounts to be drawn from each payment source, according to the preference settings received by the processor in process flow 526.

For example, if a preference setting requires that up to a maximum of $100 from a user's savings account must first be drawn to pay for a transaction before funds from a user's checking account can be drawn, and if the user's savings account has $150, the user's checking account has $100, and the transaction amount to be paid is $250, the current set of payment source(s) and preference settings may be insufficient to pay for the transaction amount since only $200 may be drawn from the payment source(s) collectively, according to the user's prescribed preference settings.

If there are insufficient funds in one or more payment sources or a set of preference source(s) for a given transaction, the processor 510A may retrieve a set of default payment source(s) and/or default preference settings from the repository to be used for the given transaction. In some embodiments, the set of default payment source(s) and/or default preference settings may include using the primary payment source account of a user, if the user has designated a payment source as a primary payment source. In some embodiments, a user may enable an overdraft to occur in one or more payment source accounts, allowing the transaction to proceed even if there are insufficient funds in one or more payment source accounts. In another embodiment, if there are insufficient funds in the one or more payment sources designated from process flow 526 for a given transaction, the supplemental payment services computing system 510 may transmit a decline of transaction authorization request to the user 502, merchant 504, and/or acquirer 506, via a payment network 508. In yet another embodiment, if there are insufficient funds in the one or more payment sources designated in process flow 526 for a given transaction, the user has designated a payment source account as a primary payment source account, and the supplemental payment account number of the user is based on the primary payment source account, the supplemental payment services computing system may transfer the transaction authorization request to the issuer or issuing computing system of the primary payment source and discontinue the transaction process in the supplemental payment services computing system.

If the set of payment sources determined from the information received in process flow 526 has sufficient funds for the transaction to be processed, process flow 530 may include the processor 510A receiving confirmation of the sufficiency of funds in the set of payment sources, from the ledger 510C and/or ledger inquiry and update server 510D Process flow 532 may include the processor lining up the payment sources according to the order prescribed in the preference settings received by the processor in process flow 526. In some embodiments, the preference settings may prescribe that funds from payment source(s) be drawn in certain proportions, irrespective of order, to pay the transaction amount. In such embodiments, process flow 532 may include arranging the respective payment source(s) in the ledger so as to indicate a simultaneous drawing of funds based on the prescribed proportions set in the preference setting. Alternatively, in such embodiments, the payment source(s) may be lined up according to a default ordering sequence. Process flow 532 may include sending the above-mentioned transaction processing information, including, for example, the ordered sequence of payment source(s) and the amount of funds to be drawn from each payment source to the ledger inquiry and update server 510D. The ledger inquiry and update server 510D may then arrange or order the payment source(s) according to the preference settings, in the ledger 510C.

In process flow 534, the processor 510A may process the transaction and compute an updated payment source data. In some embodiments, the processing and computation may be performed by the ledger inquiry and update server 510D. The computation of the updated payment source data may include, subtracting from one or more payment source accounts, the amount of funds designated to be drawn from the respective payment source(s) as prescribed by the preference settings.

Subsequently, process flow 536 may include updating the one or more payment source accounts to reflect the post transaction account balance for each of the one or more payment source accounts. Process flow 536 may be requested by the processor 510A to be performed by the ledger inquiry and update server 510D, and/or may be initiated and performed at the ledger inquiry and update server 510D.

Process flow 538 may include the ledger inquiry and update server 538 updating the ledger 510C to reflect the processed transaction and updated payment source accounts. In a preferred embodiment, the ledger 510C is shared and replicated through the payment network 508, thereby allowing other authorized parties or components of the supplemental payment services management system to see the transactional activity and the updated payment source accounts, instantaneously or immediately after. The ledger inquiry and update server 510D may utilize block chain methods for updating the ledger 510C.

In process flow 540, the supplemental payment services computing system may generate and transmit a transaction authorization response. In some embodiments, the transaction authorization response may be generated at the processor 510A of the supplemental payment services computing system 510. The transaction authorization response may be transmitted to the to the acquirer computing system 506 through the payment network 508 and/or the supplemental payment services network. In some embodiments, the transaction authorization response may be received at the authorization interface 506A of the acquirer computing system 506.

Subsequently, in process flow 542, the acquirer computing system 506 may finalize the transaction and, in some embodiments, the transaction authorization response. For example, in some embodiment, the acquirer computing system 506 may instruct the merchant POS 504A to capture a signature for the payment transaction. Additionally or alternatively, in some embodiments, an integrated circuit payment card (e.g., an EMV card or other smartcard) may be inserted into the merchant POS device 504A, which may include corresponding integrated circuit payment hardware and functionality. In such embodiments, the acquirer computing system 506 may instruct the merchant POS 504A to write payment transaction data or account data back to the integrated circuit payment card. It should be appreciated that the acquirer computing system 506, the merchant 504, and the merchant POS 504A may perform any other function to finalize the payment transaction.

Subsequently, process flow 542 may include depositing the funds obtained from the payment sources via the supplemental payment services system into the account of the merchant 504 and/or acquirer 506.

In process flow 544, the merchant 544 may transmit the finalized payment details and transaction summary user 544. In some embodiments, the merchant POS 504A generates a receipt for the payment transaction based at least in part on, or otherwise as a function of, the finalized transaction authorization response received from the acquirer computing system 506.

FIGS. 6A-D depict various screenshots of the user interface of the supplemental payment sources management system, according to an exemplary embodiment of the present disclosure. The user interface may equip the user of the supplemental payment services management system with the ability to manage supplemental payment sources, which may include but are not limited to the ability to add, delete, update, or configure payment source(s) and/or preference settings, receive messages related to the supplemental payment services management system, see transactional history related to a merchant and/or merchant group, and/or manage the payment sources and preference settings to be used for a merchant and/or merchant group. For ease of use, the user interface of the supplemental payment services management system may be categorized to display information related to payment sources, merchants, and messages, as shown by the tabs in the various screenshots of FIGS. 6A-6D.

Figure 6A:
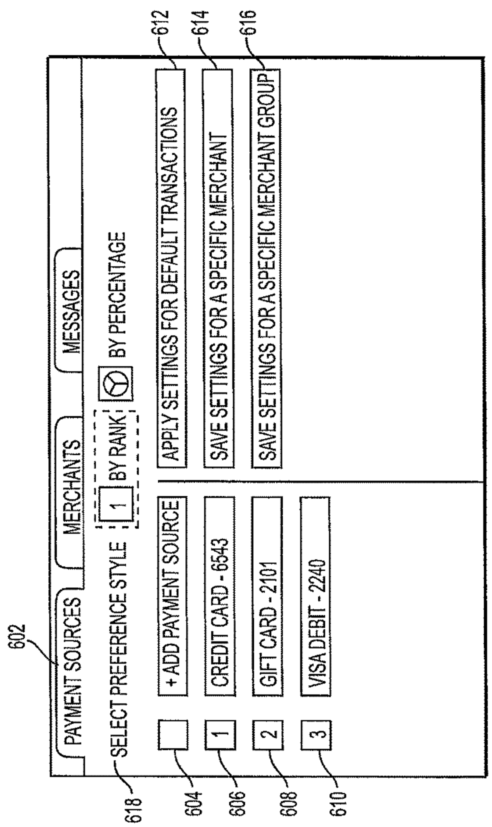
FIGS. 6A-6D depict various screenshots of user interfaces for enabling users to interact with the supplemental payment sources management system, in accordance with non-limiting embodiments.
Figure 6B:
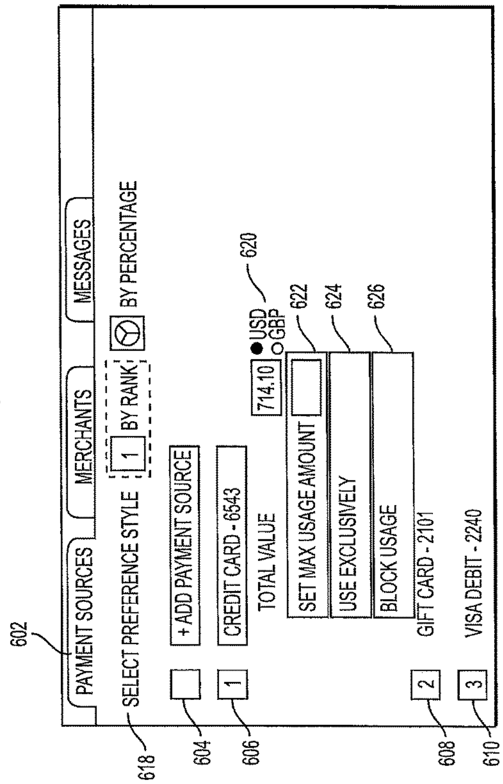

For example, FIGS. 6A and 6B depict exemplary screenshots of the user interface under the "payment sources" tab 602. As demonstrated in the exemplary screenshot of FIG. 6A, a user may select the option of adding a payment source 604 to an existing list of payment sources (e.g., "credit card—6543" 606, "gift card—2101" 608, "Visa debit—2240" 610, etc.). In some embodiments, a user may initiate the configuration of the preference settings by selecting one of two preference styles 618. The preference styles 618 may include ranking a set of preference source(s) in an order to be used for a given transaction (e.g., "by rank") or deciding the proportion of the payment amount to be paid by each payment source (e.g., "by percentage"). As depicted in FIGS. 6A and 6B, a selection of a "by rank" preference style results in the user's payment sources being ranked in the order in which a user wants the payment source(s) to be used for a given transaction. A user may be able to reorder the preference source(s) by rank by typing in the order number in the box to the left of each payment source or dragging the named payment source around so that the payment source(s) are vertically aligned in the ranking order that the user desires. In other embodiments, where the user has selected a "by percentage" preference style, a user may be able to allocate percentages for each of the payment sources to be used in the transaction by entering a percentage at the boxes to the left of each payment source. The percentages may indicate the proportion of the transaction amount to be drawn from the payment source in order to pay for the transaction. In one embodiment, the user interface may be able to enhance the user experience of configuring preference settings by performing one or more calculations for the allocation of percentages for one or more remaining payment sources once a user has allocated percentages for one or more payment sources. As depicted in FIG. 6B, selecting a payment source (e.g., "credit card—6543" 606, "gift card—2101" 608, "visa debit—2240" 610, etc.) may prompt a display of the account balance of the payment source, in one or more currencies 620. In some embodiments, a user may be able to set a limit on the amount of funds that may be drawn from a payment source, for example, by entering value of a "max usage amount" in the designated box 622. In some embodiments, the user may be able to select a payment source to be used exclusively or block a payment source from being used in the instant set of payment source(s) and preference settings, by selecting "use exclusively" 624 or "block usage" 626, respectively.

Once a user has added payment source(s), and has selected a preference setting by choosing a preference style and configuring the payment source preference settings according the preference style, a user may be able to select various options for the set of payment sources and preference setting that the user created. As depicted in FIG. 6A, a user may be able to apply the set of payment source(s) and preference settings for all default transactions (e.g., "apply settings for default transactions" 612). Selecting the option of "save settings for a specific merchant," will save the instant set of payment sources and preference settings in the repository of payment sources and preference settings associated with the supplemental payment services account of the user, for transactions originating from the specific merchant. Selecting the option of "apply settings for default transactions" will enable the supplemental payment services computing system to select the instant set of payment source(s) and preference settings for any transaction unless the user has specified that a different set of payment source(s) and/or preference settings be used. For example, the supplemental payment services computing system may trigger default payment sources and/or default preference settings when encountering a merchant or a merchant group for which the user has not yet designated a set of payment sources and/or preference settings to be used.

In some embodiments, prior to the user creating a set of payment source(s) and/or preference settings and applying the set for default transactions, the supplemental payment services computing system may use the payment source that the user designates as the primary payment source for default transactions. (e.g., all transactions for which the user has not yet configured a set of payment sources and/or preference settings).

As further depicted in FIG. 6A, a user may be able to save the set of payment source(s) and preference settings for a specific merchant (e.g., "save settings for a specific merchant" 614). Selecting the option of "save settings for a specific merchant", will save the instant set of payment sources and preference settings in the repository of payment sources and preference settings associated with the supplemental payment services account of the user, for transactions involving the specific merchant. For example, if the user were to initiate a transaction with the specific merchant in the future, the supplemental payment services computing system would be prompted to use the instant payment source(s) and preference settings to conduct the transaction.

As further depicted in FIG. 6A, in some embodiments, a user may be able to save the set of payment source(s) and preference settings for a specific merchant group ("save settings for a specific merchant group" 616). In some embodiments, the user may manually create merchant groups and place one or more merchants into a merchant group for the purpose of managing the payment source(s) and/or preference settings to be used. Additionally or alternately, the supplemental payment services computing system may automatically categorize merchants as belonging to a merchant group, using the identifying information about the merchant obtained with the transaction authorization request (MCC, MID, etc.). Selecting the option of "save settings for a specific merchant group," will save the instant set of payment sources and preference settings in the repository of payment sources and preference settings associated with the supplemental payment services account of the user, for transactions involving merchants within the specific merchant group.

Figure 6C:
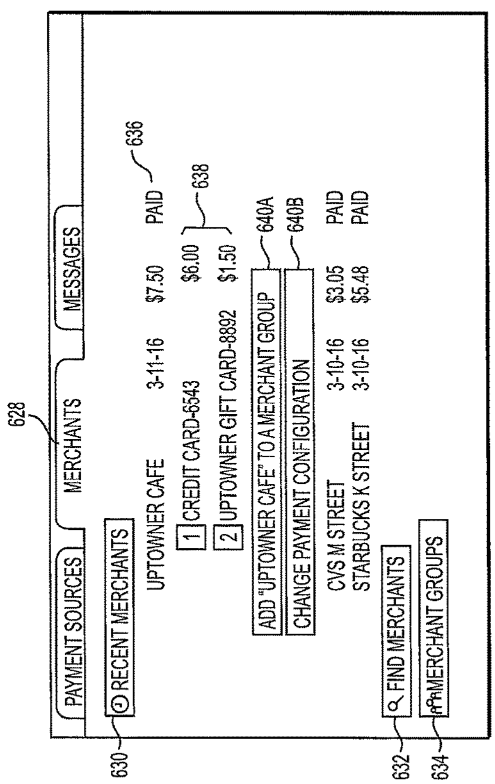

FIG. 6C depicts an exemplary screenshot of the user interface under the "merchants" tab 628. An exemplary page under the merchants tab may include subcategories related to recent merchants 630, find merchants 632, and merchant groups 634. As depicted in FIG. 6C, selecting the option of "recent merchants" 630 provides information related to recent transactions 636, which may include the name or identifying information of the recent merchant, the date of the transaction, the amount of the transaction, and the status of the transaction (e.g., paid, declined, processing, etc.). In one embodiment, selecting a recent transaction may result in a display of the payment sources used or attempted to be used for the transaction and the amounts drawn or attempted to be drawn from each payment source (e.g., as in 638). Selecting a recent transaction may also result in a display of options including an option to add the recent merchant to a merchant group (e.g., "add 'uptowner café' to a merchant group" 640A) and the option to set up or update a set of payment source(s) and preference settings for the merchant (e.g., "set a payment configuration" 640B)

In some embodiments, a "find merchants" option 632 may enable a user to look up merchants using, for example, geographical search and/or a keyword search. The look up of merchants may be useful to a user who would like to create a set of payment source(s) and preference settings for that particular merchant.

In some embodiments, a "merchants groups" option 634 may enable a user to browse the merchant groups for merchants that the user and/or the supplemental payment services system has placed, create payment configurations for the merchant groups, and add, delete, or update information related to new merchant groups.

Figure 6D:
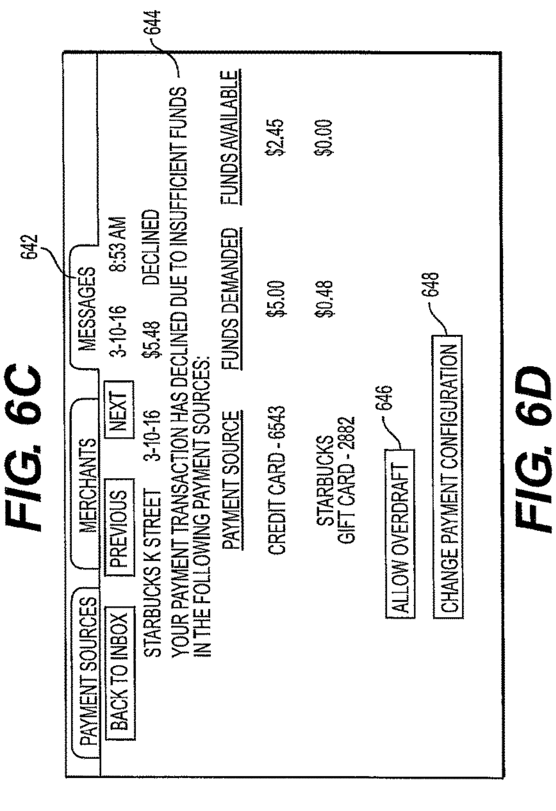

FIG. 6D depicts an exemplary screenshot of the user interface under the "messages" tab 642. In some embodiments, the user interface may relay important notifications to the user through features such as the "messages" tab 642. In some embodiment, the "messages" tab may be in the form of an inbox, with the option of scrolling through messages using a "previous" and "next" option, with dates and times contextualizing the message. As depicted in FIG. 6D, an important notification may be the decline of a payment transaction request due to insufficient funds in one or more payment sources in the set of payment source(s) and preference settings chosen for the particular transaction (e.g., "Your payment transaction has declined due to insufficient funds in the following payment sources: . . . " 644). In some embodiments, in the case of a decline of a payment transaction request due to insufficient funds in one or more payment sources, the user interface may present the user with one or more options. For example, one option may be to allow the payment to proceed even though there are insufficient funds in one or more payment sources of the set of payment source(s) and preference settings selected for the transaction, resulting in an overdrawn or overdraft payment source account (e.g., "allow overdraft" 646). Another option may include allowing the user to change the set of payment source(s) and/or preference settings being used for the instant transaction (e.g., "change payment configuration" 648).

These and other embodiments of the systems and methods may be used as would be recognized by those skilled in the art. The above descriptions of various systems and methods are intended to illustrate specific examples and describe certain ways of making and using the systems disclosed and described here. These descriptions are neither intended to be nor should be taken as an exhaustive list of the possible ways in which these systems can be made and used. A number of modifications, including substitutions of systems between or among examples and variations among combinations can be made. Those modifications and variations should be apparent to those of ordinary skill in this area after having read this disclosure.

It is intended that the specification and examples be considered as exemplary only, with a true scope and spirit of the invention being indicated by the following claims.

What is claimed is:

1. A computer-implemented method of managing a plurality of supplemental payment sources of a user, the method comprising:

receiving, at a payment services computing system over the computer network, by way of a user interface over a computer network, an identifier of a primary payment source account of a user for applying resources to transactions originating at one or more merchants, the primary payment source account being accounted for in a first data structure of a shared ledger, in an electronic storage medium of the payment services computing system, wherein the primary payment source account is represented by a primary payment source payment vehicle;

receiving, at the payment services computing system over the computer network, by way of the user interface over the computer network, identifiers of one or more supplemental payment source accounts of the user for applying resources to transactions originating at one or more merchants, the supplemental payment source accounts being accounted for in second and subsequent data structures of the shared ledger, in the electronic storage medium of the payment services computing system, wherein the identifiers of the supplemental payment source accounts are linked in the second and subsequent data structures to the primary payment source account, and wherein the resources in the supplemental payment source accounts are applicable to transactions by the user presenting only the primary payment source payment vehicle to originate the transactions;

receiving, from the user, by way of the user interface, and storing, in a linkage dataset of the payment services computing system, linked to the identifier of the user's primary payment source account, preference settings for applying resources of the primary payment source account and one or more of the supplemental payment source accounts to merchant transactions, based on merchant category identifiers of merchants involved in the transactions, wherein the user interface comprises fields allowing user entry of (i) a plurality of payment combinations, each payment combination comprising identifiers of a combination of payment sources selectable from among the primary payment source account and the supplemental payment source accounts, each payment combination optionally including the primary payment source account, and (ii) an identifier of a specific merchant or merchant group linked to each combination;

receiving, at the payment services computing system over the computer network, a transaction authorization request from a merchant or merchant acquirer involved in a transaction, wherein the transaction was originated by the user presenting the primary payment source payment vehicle whereby the authorization request identifies the primary payment source account of the user, an amount of the transaction, an identifier of the merchant at which the transaction originates, and a merchant category identifier of the merchant at which the transaction originates;

identifying, by a computer processor of the payment services computing system, the preference settings linked, in the linkage dataset of the payment services computing system, the user's primary payment source account based on the received identifier of the user's primary payment source account and the received merchant identifier or merchant category identifier of the merchant at which the transaction originates;

evaluating, by the computer processor of the payment services computing system, the identified preference settings to identify from among the plurality of payment combinations a combination of payment source accounts to use in relation to the transaction, the combination being allocated to the transaction according to the evaluated preference settings and based on the merchant identifier or the merchant category identifier of the merchant involved in the transaction;

processing, by the computer processor of the payment services computing system, the transaction using resources defined by the identified combination of payment source accounts, wherein processing the transaction comprises accounting for deducting resources from the primary payment source account and/or one or more supplemental payment source accounts according to the identified combination;

updating, by the computer processor of the payment services computing system, the first, second, and/or subsequent data structures of the shared ledger, in the electronic storage medium, to reflect the accounting for deducting resources from the accounts of the primary payment source account and supplemental payment source accounts according to the identified combination; and transmitting, over the computer network, a transaction authorization response to the merchant or merchant acquirer.

2. The method of claim 1, wherein identifying a combination of payment sources to use in the payment transaction and preference settings for applying the combination of payment sources in the payment transaction includes:

querying the electronic storage medium to determine, using the identifier of the user's primary payment source account and the received merchant identifier or merchant category identifier of the merchant, if there is among the plurality of payment combinations a combination of one or more payment source accounts to use in the payment transaction, from a group comprising one or more supplemental payment source accounts and the primary payment source account, and if there are one or more preference settings for applying the combination of payment source accounts in the payment transaction; and if the electronic storage medium has a combination of payment source accounts to use in the payment transaction and one or more preference settings for applying the combination of payment sources in the transaction, determining and assigning one or more amounts to be deducted for each of the one or more payment source accounts in the combination of payment source accounts to use in the purchase transaction, using, one or more preference settings for applying the combination of payment source accounts in the payment transaction and based on the merchant identifier or the merchant category identifier of the merchant involved in the transaction, and if the electronic storage medium does not have a combination of payment source accounts to use in the payment transaction or one or more preference settings for applying the combination of payment sources in the transaction, assigning the transaction amount to be drawn from the primary payment source account.

3. The method of claim 1, wherein the ledger is shared, at least with the merchant or merchant acquirer, can be replicated, at least within a payment network, and can be updated using a block chain method.

4. The method of claim 1, wherein the preference settings for applying the combination of payment source accounts in the payment transaction, includes, one or more of:

ranking the one or more payment source accounts, from the combination of payment source accounts to use in the payment transaction, in the order in which accounts are to be drawn to satisfy the transaction amount during a payment transaction;

assigning to each of the one or more payment source accounts, from the combination of payment source accounts to use in the payment transaction, a percentage of the transaction amount to be supplied by each payment source account to satisfy the transaction amount during the payment transaction; and assigning a minimum or maximum limit to the amount of funds that can be drawn from any one or more payment source accounts, from the combination of payment source accounts to use in the payment transaction.

5. The method of claim 1, further comprising, prior to processing the transaction, querying a ledger to determine whether each of the one or more payment source accounts, from the combination of payment source accounts to use in the payment transaction, has sufficient funds for the transaction in the amounts assigned for each of the one or more payment source accounts; and upon determining that one or more of the payment source accounts, from the combination of payment source accounts to use in the payment transaction, does not have sufficient funds for the transaction, transmitting a denial of the transaction authorization request to one or more of the user, merchants, or merchant acquirer over a payment network, and discontinuing the payment transaction at the supplemental payment services computing system.

6. The method of claim 1, further comprising displaying information related to recent transactions, including, one or more of:

the merchants or types of merchant from which the recent transactions originated;

the transaction amounts involved in the recent transaction;

the combination of payment source accounts used for each of the recent transactions;

the amounts drawn from each of the one or more payment source accounts in combination of payment source accounts used in the recent transactions; and the status of each of the recent transaction.

7. The method of claim 1, wherein the user interface further comprises user interface elements by which a user of the supplemental payment sources managing system may perform one or more of:

updating or changing a primary payment source account adding or deleting a supplemental payment source account;

creating or updating preference settings for applying the combination of payment source accounts in the payment transaction; and assigning to a merchant or merchant group, a combination of payment source accounts to use in the payment transaction originating from the merchant or merchant group, from a group comprising of one or more supplemental payment source accounts and the primary payment source account, and any one or more preference settings for applying the combination of payment source accounts in the payment transactions originating from the merchant or merchant group.

8. The method of claim 1, wherein, one or more of, the preference settings, supplemental payment source accounts, and the primary payment service account is assigned to be used by default in a payment transaction.

9. A system for managing a plurality of supplemental payment sources of a user, the system comprising:

a data storage device storing instructions for managing a plurality of supplemental payment sources of a user; and a processor configured to execute the instructions to perform a method including:

receiving, at a payment services computing system over the computer network, by way of a user interface over a computer network, an identifier of a primary payment source account of a user for applying resources to transactions originating at one or more merchants, the primary payment source account being accounted for in a first data structure of a shared ledger, in a electronic storage medium of the payment services computing system, wherein the primary payment source account is represented by a primary payment source payment vehicle;

receiving, at the payment services computing system over the computer network, by way of the user interface over the computer network, identifiers of one or more supplemental payment source accounts of the user for applying resources to transactions originating at one or more merchants, the supplemental payment source accounts being accounted for in second and subsequent data structures of the shared ledger, in the electronic storage medium of the payment services computing system, wherein the identifiers of the supplemental payment source accounts are linked in the second and subsequent data structures to the primary payment source account, and wherein the resources in the supplemental payment source accounts are applicable to transactions by the user presenting only the primary payment source payment vehicle to originate the transactions;

receiving, from the user, by way of the user interface, and storing, in a linkage dataset of the payment services computing system, linked to the identifier of the user's primary payment source account, preference settings for applying resources of the primary payment source account and one or more of the supplemental payment source accounts to merchant transactions, based on merchant categories of merchants involved in the transactions, wherein the user interface comprises fields allowing user entry of (i) a plurality of payment combinations, each payment combination comprising identifiers of a combination of payment sources selectable from among the primary payment source account and the supplemental payment source accounts, each payment combination optionally including the primary payment source account, and (ii) an identifier of a specific merchant or merchant group linked to each combination;

receiving, over the computer network, a transaction authorization request from a merchant or merchant acquirer involved in a transaction, wherein the transaction was originated by the user presenting the primary payment source payment vehicle whereby the authorization request identifies the primary payment source account of the user, an amount of the transaction, an identifier of the merchant at which the transaction originates, and a merchant category identifier of the merchant at which the transaction originates;

identifying, by a computer processor of the payment services computing system, the preference settings linked, in the linkage dataset of the payment services computing system, to the user's primary payment source account based on the received identifier of the user's primary payment source account and the received merchant identifier or merchant category identifier of the merchant at which the transaction originates;

evaluating, by the computer processor of the payment services computing system, the identified preference settings to identify from among the plurality of payment combinations a combination of payment source accounts to use in relation to the transaction, the combination being allocated to the transaction according to the evaluated preference settings and based on the merchant identifier or the merchant category identifier of the merchant involved in the transaction;

processing, by the computer processor of the payment services computing system, the transaction using resources defined by the identified combination of payment source accounts, wherein processing the transaction comprises accounting for deducting resources from the primary payment source account and/or one or more supplemental payment source accounts according to the identified combination;

updating, by the computer processor of the payment services computing system, the first, second, and/or subsequent data structures of the shared ledger, in the electronic storage medium, to reflect the accounting for deducting resources from the accounts of the primary payment source account and supplemental payment source accounts according to the identified combination; and transmitting, over the computer network, a transaction authorization response to the merchant or merchant acquirer.

10. The system of claim 9, wherein identifying a combination of payment sources to use in the payment transaction and preference settings for applying the combination of payment sources in the payment transaction includes:

querying an electronic storage medium to determine, using the identifier of the user's primary payment source account and the received merchant identifier or merchant category identifier of the merchant, if there is among the plurality of payment combinations a combination of one or more payment source accounts to use in the payment transaction, from a group comprising one or more supplemental payment source accounts and the primary payment source account, and if there are one or more preference settings for applying the combination of payment source accounts in the payment transaction; and if the electronic storage medium has a combination of payment source accounts to use in the payment transaction and one or more preference settings for applying the combination of payment sources in the transaction, determining and assigning one or more amounts to be deducted for each of the one or more payment source accounts in the combination of payment source accounts to use in the purchase transaction, using, one or more preference settings for applying the combination of payment source accounts in the payment transaction and based on the merchant identifier or the merchant category identifier of the merchant involved in the transaction, and if the electronic storage medium does not have a combination of payment source accounts to use in the payment transaction or one or more preference settings for applying the combination of payment sources in the transaction, assigning the transaction amount to be drawn from the primary payment source account.

11. The system of claim 9, wherein the ledger is shared, at least with the merchant or merchant acquirer, can be replicated, at least within a payment network, and can be updated using a block chain method.

12. The system of claim 9, wherein the preference settings for applying the combination of payment source accounts in the payment transaction, includes, one or more of:

ranking the one or more payment source accounts, from the combination of payment source accounts to use in the payment transaction, in the order in which accounts are to be drawn to satisfy the transaction amount during a payment transaction;

assigning to each of the one or more payment source accounts, from the combination of payment source accounts to use in the payment transaction, a percentage of the transaction amount to be supplied by each payment source account to satisfy the transaction amount during the payment transaction; and assigning a minimum or maximum limit to the amount of funds that can be drawn from any one or more payment source accounts, from the combination of payment source accounts to use in the payment transaction.

13. The system of claim 9, wherein the transaction authorization request is received using a payment network and wherein the transaction authorization response is transmitted using a payment network.

14. The system of claim 9, wherein the payment network is hosted by the supplemental payment services computing system.

15. The system of claim 9, further comprising, prior to processing the transaction, querying a ledger to determine whether each of the one or more payment source accounts, from the combination of payment source accounts to use in the payment transaction, has sufficient funds for the transaction in the amounts assigned for each of the one or more payment source accounts; and upon determining that one or more of the payment source accounts, from the combination of payment source accounts to use in the payment transaction, does not have sufficient funds for the transaction, transmitting a denial of the transaction authorization request to one or more of the user, merchants, or merchant acquirer over a payment network, and discontinuing the payment transaction at the supplemental payment services computing system.

16. The system of claim 9, further comprising displaying information related to recent transactions, including, one or more of:

the merchants or types of merchant from which the recent transactions originated;

the transaction amounts involved in the recent transaction;

the combination of payment source accounts used for each of the recent transactions;

the amounts drawn from each of the one or more payment source accounts in combination of payment source accounts used in the recent transactions; and the status of each of the recent transaction.

17. The system of claim 9, wherein the user interface further comprises user interface elements by which a user of the supplemental payment sources managing system may perform one or more of:

updating or changing a primary payment source account adding or deleting a supplemental payment source account;

creating or updating preference settings for applying the combination of payment source accounts in the payment transaction; and assigning to a merchant or merchant group, a combination of payment source accounts to use in the payment transaction originating from the merchant or merchant group, from a group comprising of one or more supplemental payment source accounts and the primary payment source account, and any one or more preference settings for applying the combination of payment source accounts in the payment transactions originating from the merchant or merchant group.

18. A non-transitory machine-readable medium storing instructions that, when executed by a supplemental payment service computing system, cause the supplemental payment service computing system to perform a method for managing a plurality of supplemental payment sources of a user, the method including:

receiving, at a payment services computing system over the computer network, by way of a user interface over a computer network, an identifier of a primary payment source account of a user for applying resources to transactions originating at one or more merchants, the primary payment source account being accounted for in a first data structure of a shared ledger, in an electronic storage medium of the payment services computing system, wherein the primary payment source account is represented by a primary payment source payment vehicle;

receiving, at the payment services computing system over the computer network, by way of the user interface over the computer network, identifiers of one or more supplemental payment source accounts of the user for applying resources to transactions originating at one or more merchants, the supplemental payment source accounts being accounted for in second and subsequent data structures of the shared ledger, in the electronic storage medium of the payment services computing system, wherein the identifiers of the supplemental payment source accounts are linked in the second and subsequent data structures to the primary payment source account, and wherein the resources in the supplemental payment source accounts are applicable to transactions by the user presenting only the primary payment source payment vehicle to originate the transactions;

receiving, from the user, by way of the user interface, and storing, in a linkage dataset of the payment services computing system, linked to the identifier of the user's primary payment source account, preference settings for applying resources of the primary payment source account and one or more of the supplemental payment source accounts to merchant transactions, based on merchant category identifiers of merchants involved in the transactions, wherein the user interface comprises fields allowing user entry of (i) a plurality of payment combinations, each payment combination comprising identifiers of a combination of payment sources selectable from among the primary payment source account and the supplemental payment source accounts, each payment combination optionally including the primary payment source account, and (ii) an identifier of a specific merchant or merchant group linked to each combination;

receiving, at the payment services computing system over the computer network, a transaction authorization request from a merchant or merchant acquirer involved in a transaction, wherein the transaction was originated by the user presenting the primary payment source payment vehicle whereby the authorization request identifies the primary payment source account of the user, an amount of the transaction, the merchant at which the transaction originates, and a merchant category identifier of the merchant at which the transaction originates;

identifying, by a computer processor of the payment services computing system, the preference settings linked, in the linkage dataset of the payment services computing system, in relation to the user's primary payment source account based on the received identifier of the user's primary payment source account and the received merchant identifier or merchant category identifier of the merchant at which the transaction originates;

evaluating, by the computer processor of the payment services computing system, the identified preference settings to identify from among the plurality of payment combinations a combination of payment source accounts to use in relation to the transaction, the combination being allocated to the transaction according to the evaluated preference settings and based on the merchant identifier or merchant category identifier of the merchant involved in the transaction;

processing, by the computer processor of the payment services computing system, the transaction using resources defined by the identified combination of payment source accounts, wherein processing the transaction comprises accounting for deducting resources from the primary payment source account and/or one or more supplemental payment source accounts according to the identified combination;

updating, by the computer processor of the payment services computing system, the first, second, and/or subsequent data structures of the shared ledger, in the electronic storage medium, to reflect the accounting for deducting resources from the accounts of the primary payment source account and supplemental payment source accounts according to the identified combination; and transmitting, over the computer network, a transaction authorization response to the merchant or merchant acquirer.

* * * * *